(12) United States Patent
Kelley et al.

(10) Patent No.: US 12,461,038 B2
(45) Date of Patent: Nov. 4, 2025

(54) SYSTEMS AND METHODS FOR DEVICE-INDEPENDENT COLOR MEASUREMENTS FOR COLORIMETRIC SENSING

(71) Applicant: MOZARC MEDICAL US LLC, Minneapolis, MN (US)

(72) Inventors: Shawn C. Kelley, Shoreview, MN (US); Michael N Missaghi, Edina, MN (US); Sumaya M Abdullahi, Columbia Heights, MN (US); Subin Sebastian, Kattappana (IN)

(73) Assignee: MOZARC MEDICAL US LLC, Minneapolis, MN (US)

( * ) Notice: Subject to any disclaimer, the term of this patent is extended or adjusted under 35 U.S.C. 154(b) by 812 days.

(21) Appl. No.: 17/541,571

(22) Filed: Dec. 3, 2021

(65) Prior Publication Data

US 2023/0175972 A1  Jun. 8, 2023

(51) Int. Cl.
| | |
|---|---|
| *G01N 21/80* | (2006.01) |
| *G01N 21/31* | (2006.01) |
| *G06T 7/80* | (2017.01) |
| *G06T 7/90* | (2017.01) |
| *H04N 9/67* | (2023.01) |
| *H04N 23/56* | (2023.01) |

(52) U.S. Cl.
CPC .............. *G01N 21/80* (2013.01); *G01N 21/31* (2013.01); *G06T 7/80* (2017.01); *G06T 7/90* (2017.01); *H04N 9/67* (2013.01); *H04N 23/56* (2023.01); *G06T 2207/10024* (2013.01); *G06T 2207/10144* (2013.01)

(58) Field of Classification Search
CPC .......... G01N 21/80; G01N 21/31; G06T 7/80; G06T 7/90; G06T 2207/10024; G06T 2207/10144; H04N 23/56; H04N 9/67
USPC ......................................................... 702/85
See application file for complete search history.

(56) References Cited

U.S. PATENT DOCUMENTS

| 9,466,104 | B2 | 10/2016 | Tsai | |
| 2003/0234872 | A1* | 12/2003 | Matherson | H04N 25/61 348/222.1 |
| 2020/0085171 | A1* | 3/2020 | Metten | G01J 3/524 |
| 2020/0400584 | A1* | 12/2020 | Lura | G01N 31/221 |
| 2021/0039025 | A1* | 2/2021 | Klein | B01D 35/1435 |
| 2021/0190585 | A1* | 6/2021 | Valouch | G01J 3/0229 |

(Continued)

FOREIGN PATENT DOCUMENTS

| CN | 206270244 U | * | 6/2017 | |
| CN | 111919105 A | * | 11/2020 | G01J 3/2823 |

(Continued)

OTHER PUBLICATIONS

English translation of CN206270244, Jun. 20, 2017. (Year: 2017).*

(Continued)

*Primary Examiner* — Michael P Nghiem

(57) ABSTRACT

A calibration method and related systems for colorimetric chemical assay and a fluid sensor apparatus using the same are provided. Reference measurements are taken from both a digital camera and a spectrometer. The digital camera is installed in the fluid sensor apparatus. Subsequently, color measurements from the digital camera are then converted and compared to prior spectrometric measurements to perform a colorimetric analysis.

9 Claims, 12 Drawing Sheets

(56) References Cited

U.S. PATENT DOCUMENTS

| | | | |
|---|---|---|---|
| 2021/0325299 A1* | 10/2021 | Hardie | G01N 21/8483 |
| 2023/0184084 A1* | 6/2023 | Anifowose | G01V 5/04 |
| | | | 702/11 |
| 2023/0236174 A1* | 7/2023 | Alperowitz | B01L 3/5023 |
| | | | 436/169 |
| 2023/0243780 A1* | 8/2023 | Ohtsu | H01L 21/02041 |
| | | | 430/311 |
| 2023/0262339 A1* | 8/2023 | Berg | H04N 23/71 |
| | | | 348/135 |

FOREIGN PATENT DOCUMENTS

| | | | | |
|---|---|---|---|---|
| EP | 3447488 A1 | * | 2/2019 | G01N 21/78 |
| EP | 3904864 A1 | * | 11/2021 | G01N 21/783 |
| KR | 20160099620 A | * | 8/2016 | |
| WO | 2017027040 | | 2/2017 | |

OTHER PUBLICATIONS

English translation of KR20160099620, Aug. 22, 2016. (Year: 2016).*
English translation of CN111919105, Nov. 10, 2020 (Year: 2020).*
Dell, et al. (2011). Towards a point-of-care diagnostic system: automated analysis of immunoassay test data on a cell phone. 10.1145/1999927.1999931.
Florea, et al. (2013). Dynamic pH mapping in microfluidic devices by integrating adaptive coatings based on polyaniline with colorimetric imaging techniques. Lab on a chip. 13. 10.1039/c2lc41065f.

* cited by examiner

SYSTEMS AND METHODS FOR DEVICE-INDEPENDENT COLOR MEASUREMENTS FOR COLORIMETRIC SENSING

FIELD OF THE INVENTION

Systems, methods, and components are provided for colorimetric analysis. Specifically, the systems and methods can be used to calibrate a conventional digital camera to perform colorimetric analysis and chemical assay. The system, methods, and components can be used in any application with any fluid in which the composition, color, or clarity of the fluid is being determined. In one non-limiting application, the system, methods, and components can be applied to analyze fluid used in dialysis.

BACKGROUND

Chemical assays exist in the form of sensor films or strips for visual assessment. When placed in contact with a fluid having certain properties, a region of the film changes color wherein a particular hue and brightness of the color can depend on the specifics of the fluid being analyzed. However, assessing such a sensor film poses a problem for automated systems due to variation in camera equipment and related specifications of a specific device. While a human user may be instructed to perform an action when a strip "turns blue," the known approaches cannot be programmed to be reliably within a precise range of data, which is accessible by the device's sensors, that would trigger that same action, regardless of camera type. While the color "blue" can be defined as light falling within a particular nanometer range, the available approaches cannot measure the range without the application of a spectrometer—an expensive addition to a portable chemical assay device. The CMOS image sensors associated with such cameras vary significantly among individual units as to what intensities they record. They also vary based on the lighting conditions under which they are used, the optical properties of the camera lenses, and the circuitry with which they are coupled. Conventional approaches and devices fail to provide for a process for calibrating commonly available cameras to avoid the use of a spectrometer in an automated color sensing system.

Hence, the need exists for a reliable assay method based on the visual capabilities of a commonly available and/or low-cost digital camera. The need extends to system, methods, and components that can calibrate image sensors in different cameras to avoid variation between individual units. The need also includes systems and methods that can be used to calibrate readily-available cameras of varying specifications for use in a chemical assay application such that the same results can be reliably produced across all cameras regardless of the specific intensities that each individual camera records. The need also includes system and methods that can calibrate a camera based on the lighting conditions under which they are used, the optical properties of the camera lenses, and the circuitry with which they are coupled.

SUMMARY OF THE INVENTION

The problem to be solved is calibrating various digital cameras for use in chemical color analysis. One way to solve the problem is to calibrate a digital camera using fit parameters. The first aspect of the invention relates to a method for calibrating a digital camera including the step of determining fit parameters for a characteristic equation that inputs a set of the two or more image color values associated with a captured image element and outputs a spectral color value. The determination can be based on images taken at a plurality of different exposure times by the digital camera of each of a plurality light sources, a set of image color values for each of two or more colors associated with elements in each captured image, and based on one or more spectral color values associated with each of the plurality of light sources obtained from spectrometer measurements.

In any embodiment, each of the one or more spectral color values can be determined from separate count values of two or more wavelengths measured by the spectrometer.

In any embodiment, each set of image color values can include RGB values. Each spectral color value can include one or more of the CIELAB color space coordinates, L*, a*, and/or b*.

In any embodiment, for each of the plurality of light sources and for each of the RGB values, slope can be determined representing a linear relationship between exposure time and image color value. The slope can be used to determine fit parameters for the characteristic equation.

In any embodiment, the camera can further include an on-board LED module. The method can further include the steps of: for each of a plurality of color reference cards, imaging the card illuminated by the LED module using the digital camera; and determining brightness and color correction factors on the image color values based on the images of the color references cards.

In any embodiment, the color reference cards can be filmed through an aqueous solution.

In any embodiment, the method further includes the step of: for each of one or more chemical sensor films, measuring the film by the spectrometer through an aqueous solution of a chemical associated with the sensor film, and associating a spectral color value with each chemical sensor film. The fit parameters can be determined based on the associated spectral color values of the one or more chemical sensor films.

In any embodiment, the camera can further include an onboard LED module, the LED module illuminating each of the one or more chemical sensor films when measuring by the spectrometer.

In any embodiment, the method further includes the step of: for each of one or more chemical sensor films, measuring the film by the spectrometer through a gas including a chemical associated with the sensor film, and associating a spectral color value with each chemical sensor film. The fit parameters can be determined based on the associated spectral color values of the one or more chemical sensor films.

The features disclosed as being part of the first aspect of the invention can be in the first aspect of the invention, either alone or in combination, or follow any arrangement or permutation of any one or more of the described elements. Similarly, any features disclosed as being part of the first aspect of the invention can be in a second or third aspect of the invention described below, either alone or in combination, or follow any arrangement or permutation of any one or more of the described elements.

The second aspect of the invention relates to a method of measuring a fluid solution. In any embodiment, the method includes the steps of: imaging a chemical sensor film in the fluid solution with an imaging device to record one or more images; converting the one or more images to one or more CIELAB spectral color values, wherein the conversion is based on calibration measurements previously taken of the same light sources using each of the RGB camera and a spectrometer; and converting the one or more CIELAB spectral color values to one or more chemical measurements, wherein the conversion is based on spectral color values previously measured by the spectrometer of one or more other chemical sensor films in one or more other fluid solutions having known chemical properties.

In any embodiment, the imaging device is an RGB camera, and the one or more images contain RGB color values.

In any embodiment, the fluid solution can be an aqueous solution. The method can be used to determine a pH range of the aqueous solution.

In any embodiment, the fluid solution can be an aqueous solution. The method can be used to determine an ammonia concentration threshold of the aqueous solution.

The features disclosed as being part of the second aspect of the invention can be in the second aspect of the invention, either alone or in combination, or follow any arrangement or permutation of any one or more of the described elements. Similarly, any features disclosed as being part of the second aspect of the invention can be in the first or third aspect of the invention described above and below, either alone or in combination, or follow any arrangement or permutation of any one or more of the described elements.

The third aspect of the invention relates to a chemical assay device. In any embodiment, the chemical assay device includes a camera; a specimen module including an exchangeable chemical sensor film and an aqueous solution; an LED module illuminating the chemical sensor film through the aqueous solution; the camera determining image color values for the sensor film while illuminated; and a device controller programmed to convert the image color values to a spectral color value.

In any embodiment, the controller can be programmed to give a chemical assay test result based on the spectral color value.

In any embodiment, the chemical assay test result can be a pH range of the aqueous solution.

In any embodiment, the chemical assay test result can be an ammonia concentration threshold.

The features disclosed as being part of the third aspect of the invention can be in the third aspect of the invention, either alone or in combination, or follow any arrangement or permutation of any one or more of the described elements. Similarly, any features disclosed as being part of the third aspect of the invention can be in the first or second aspect of the invention, either alone or in combination, or follow any arrangement or permutation of any one or more of the described elements.

DETAILED DESCRIPTION OF THE INVENTION

Figure 1A:
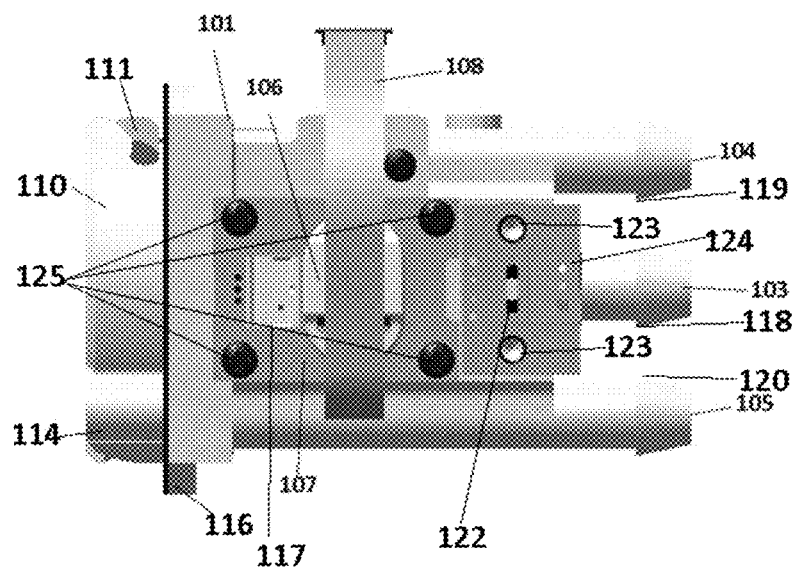
FIGS. 1A-F show a side, perspective, and top view of a fluid sensor apparatus.

Unless defined otherwise, all technical and scientific terms used herein generally have the same meaning as commonly understood by one of ordinary skill in the relevant art.

The articles "a" and "an" are used herein to refer to one or to more than one (i.e., to at least one) of the grammatical object of the article. For example, "an element" means one element or more than one element.

The term "a*" refers to the "a*" value in the CIE 1976 L*a*b* color space for a three-dimensional, approximately uniform color space produced by plotting in rectangular coordinates, L*, a*, b* as provided in International Standard ISO/CIE 11664-4:2019(E) Colorimetry—Part 4: CIE 1976 L*a*b* colour space.

The term "aligned" refers to the relative positions of two components, wherein one component is overlaying or positioned close to the second component.

The term "ammonia level" refers to a concentration of ammonia ($NH_3$).

The term "ammonium level" refers to a concentration of ammonium cation ($NH_4^+$).

An "ammonia sensing membrane" is any material, substance, dye, or composition that can detect an ammonia level. The detected output can be a color change, or color intensity change. The output can also include any detectable physical or chemical change.

The term "b*" refers to the "b*" value in the CIE 1976 L*a*b* color space for a three-dimensional, approximately uniform color space produced by plotting in rectangular coordinates, L*, a*, b* as provided in International Standard ISO/CIE 11664-4:2019(E) Colorimetry—Part 4: CIE 1976 L*a*b* colour space.

A "bevel" is an opening or groove in a component having a slope from the otherwise horizontal or vertical face of the component.

A "bright reference spot" is a region of a reference image that corresponds to a color expected to register as high intensity in at least one color value. In some embodiments, a "bright reference spot" may be chosen for its similarity to the hue and intensity of one or more chemical sensor films.

To "calibrate" is to use a sensor on a subject associated with known data, compare those measurements against the known data, and apply corrections to further measurements from the sensor based on the comparison.

A "camera," "photodetector," and the like is a component capable of detecting light intensity, light composition, or both to result in data, such as an image, of the light detected. The terms "camera" and "photo detector" can also generally refer to any type of detector including an RGB detector or spectrophotometer.

A "carrier" is a component on a sensor card overlaying one or more fluid sensor membranes. The terms "front carrier" or "back carrier" refer to carriers on either side of the fluid sensor membranes on the front side and back side of the sensor card, respectively.

A "center axis" is an imaginary line through the center of a component or region. For example, a center axis can be positioned at substantially a center portion of a surface plane of a sensor card or lens and perpendicular to the surface plane.

The term "clarity" refers to an amount of radiant light or energy shined on a fluid that passes through the fluid.

A "clear aqueous solution" is a solution of any substance or substances dissolved in water that is substantially translucent.

The term "cloudiness" refers to the amount of light transmitted through a fluid containing one or more solutes as compared to the amount of light transmitted through the fluid without any solutes.

The term "color" refers to the wavelength of light reflected from or transmitted through a component or feature.

The term "color spectra" refers to one or more measurements of positions in color space along the perceptual visual spectra. CIELAB values, represented by the three quantities $L^*$, $a^*$, and $b^*$, represent a color spectra measurement.

The terms "communication" or "electronic communication" refer to the ability to transmit electronic information between two components or systems.

The phrase "composition of a fluid" can refer to the concentration of any one or more solutes in the fluid.

The term "comprising" includes, but is not limited to, whatever follows the word "comprising." Use of the term indicates the listed elements are required or mandatory but that other elements are optional and may be present.

The term "consisting of" includes and is limited to whatever follows the phrase "consisting of." The phrase indicates the limited elements are required or mandatory and that no other elements may be present.

The term "consisting essentially of" includes whatever follows the term "consisting essentially of" and additional elements, structures, acts or features that do not affect the basic operation of the apparatus, structure or method described.

The term "continuously" refers to a process that proceeds without stopping.

The terms "correlation" and "correlated" refers to two sets of values having a quantified statistical relationship of above a threshold level of significance. Linear regression, chi-squared analysis, t-independence, and other statistical methods can be used to determine correlation.

The terms "detecting," "detected," or "to detect" refer to determining a state or characteristic of a system.

The terms "determining" and "determine" refer to ascertaining a particular state of a system or variable(s).

A "dialysate flow path" is the pathway that dialysate will travel when used in normal operation for dialysis.

A "dialysate pump" is a device that causes the movement of fluids or gases through a dialysate flow path by applying suction or pressure.

A "dialysis fluid" is any fluid used in cleaning a dialysis system, priming a dialysis system, or conducting dialysis.

The term "dialyzer" refers to a cartridge or container with two flow paths separated by semi-permeable membranes. One flow path is for blood and one flow path is for dialysate. The membranes can be in hollow fibers, flat sheets, or spiral wound or other conventional forms known to those of skill in the art. Membranes can be selected from the following materials of polysulfone, polyethersulfone, poly (methyl methacrylate), modified cellulose, or other materials known to those skilled in the art.

The term "downstream" refers to a position of a first component in a flow path relative to a second component wherein fluid will pass by the second component prior to the first component during normal operation. The first component can be said to be "downstream" of the second component, while the second component is "upstream" of the first component.

The terms "emitting" or to "emit" refer to discharging light from a light source.

The term "equidistant" refers to two or more components or regions that are the same distance from a reference point.

The term "exposure length" refers to the period of time over which a camera records intensity values for an image. The unit for exposure length depends on the camera; exposure length can be a unitless quantity that reflects a relative value.

To "fit" data means to apply an equation to a set of data so that it more closely correlates to a set of reference data. The applied equation is a "fitness function". The resulting data is "corrected."

The terms "fixing," to "fix," or "fixed position" refer to a position of a component that will resist inadvertent movement.

The terms "flowing" or to "flow" "refer to the movement of a fluid or gas.

A "fluid" is a substance in a liquid and/or gaseous phase. A liquid substance having a combination of gas and liquid phases is a fluid. Notably, a liquid, as used herein, can therefore also have a mixture of gas and liquid phases of matter.

A "fluid characteristic" is any sensed characteristic of a fluid, including temperature, pressure, concentration, color, or any other characteristic.

The term "fluid flow path" refers to a pathway through which a fluid can travel.

The term "fluid inlet" refers to a conduit or opening through which fluid can enter a component or apparatus.

The term "fluid outlet" refers to a conduit or opening through which fluid can exit a component or apparatus.

The term "fluid sensor apparatus" refers to an apparatus through which fluid can be pumped to determine any one of a solute, solute concentration, ion concentration, a pH, or a combination of solutes in the fluid.

The term "fluidly connectable," "fluidly connect," "for fluid connection," "fluid communication," and the like, refer to the ability of providing for passing fluid or gas or mixtures thereof, from one point to another point. The two points can be within or between any one or more of compartments, modules, systems, components, and rechargers, all of any type. The connection can optionally be disconnected and then reconnected.

The term "green" as used in reference to color or pixel color, refers to light having a wavelength generally in a range from about 490 nm to 570 nm.

The term "groove" is a furrow or channel formed onto a surface or wall. The groove extending along the surface or wall can form a slot.

A "hemodialysis fluid" is any fluid used in cleaning a hemodialysis system, priming a hemodialysis system, or conducting hemodialysis.

A "high sensitivity ammonia sensing membrane" is an ammonia sensing membrane capable of detecting changes in ammonia concentration less than 0.4 ppm ammonia.

The term "hole" refers to an opening on at least one side of a component. The hole can optionally be an opening from one side to another side of a component.

The term "housed within" refers to a position of a component inside of a second component or system.

An "image produced by a camera" refers to a digital representation of the visible light or fluorescent light detected by the camera.

The term "insertable" refers to the ability to place one component inside or through a second component.

The term "intensity" refers to the amplitude of a light or energy wave.

The term "interior surface" refers to an interior boundary of a component.

The term "intermittently" refers to a process that stops and starts at discreet time points.

The term "L*" refers to the "L*" value in the CIE 1976 lightness (CIELAB lightness) as provided in International Standard ISO/CIE 11664-4:2019(E) Colorimetry—Part 4: CIE 1976 L*a*b* colour space.

An "LED array" is any configuration of light emitting diodes. In one non-limiting example, the LED array is a circular or consistently spaced placement of individual LED lights. The term "array," as used herein, is not intended to be limited to any particular configuration, but conveys a regularized or uniform positioning of individual LED lights. The term "LED array" is not limited to any color or colors of LEDs or any particular placement of LEDs.

A "light guide" refers to a component that can transmit light in a defined path by means of total or near total internal reflectance using reflective surfaces of any type, size, position, and length.

A "line" is a straight one-dimensional shape extending from one point in space to a second point in space.

A "light source," "light emitter," "photo emitter," or the like, is any component capable of emitting light at any wavelength including visible, infrared, or ultraviolet light.

A "low sensitivity ammonia sensing membrane" is an ammonia sensing membrane capable of detecting changes in ammonia concentration over a range of between 0.2-5 ppm ammonia, or greater than 5 ppm ammonia.

A "magnet" is a material with the constituent atoms of the material ordered so that the material attracts other magnetic objects.

The term "non-reflective" refers to a material or color that absorbs substantially all visible or ultraviolet light.

The terms "opposing," "opposite," and "positioned oppositely" refer to relative positions of two or more components wherein the two or more components are positioned substantially on opposite sides to a reference point.

The term "orthogonal" or "substantially orthogonal" refers to a component substantially at a 90° angle to a line.

The term "overlaying" refers to a first component being positioned on top of, or covering, a second component.

The term "peritoneal dialysate effluent" refers to used dialysate removed from the peritoneal cavity of a patient during peritoneal dialysis.

A "peritoneal dialysis fluid" is any fluid used in cleaning a peritoneal dialysis system, priming a peritoneal dialysis system, or conducting peritoneal dialysis.

A "pH sensing membrane" is a dye embedded in a substrate, wherein the dye changes colors in response to the pH of a fluid.

A "pixel" is a small uniformly colored area of an image. The term can also be interchangeably used to refer to a picture element on a display, computer image or screen for creating an image. The term "pixel" can also refer to sensing elements of a camera image sensor.

The term "plane" is an imaginary two-dimensional shape defined by three or more points.

The term "positioned" or "position" refers to a physical location of a component, feature, or structure.

The term "processor" as used is a broad term and is to be given its ordinary and customary meaning to a person of ordinary skill in the art. The term refers without limitation to a computer system, state machine, processor, or the like designed to perform arithmetic or logic operations using logic circuitry that responds to and processes the basic instructions that drive a computer. In any embodiment of the first, second, third, and fourth invention, the terms can include ROM ("read-only memory") and/or RAM ("random-access memory") associated therewith.

The term "receiving data" or to "receive data" refers to obtaining electronic information from a source or sensor.

The term "receiving light" or to "receive light" refers to obtaining light at any wavelength or intensity. The received light can be obtained by a sensor, a lens, a camera, a photodetector, or any surface capable of receiving light from a light source.

The term "receiving slot" is a space within a fluid sensor apparatus into which a sensor card can be placed.

A "receiving slot cover" is a component designed to fit over a receiving slot, separating the receiving slot from the outside of an apparatus.

A "receiving slot cover lock" is a component in a sensor apparatus that can engage with a cover of a receiving slot to fix the receiving slot cover in a fixed position.

A "rinseback fluid" is a fluid added to a dialysate flow path, forcing fluid from the dialysate flow path either through a dialyzer or out of a dialysis system.

A "sampling chamber" is a space or volume in which a characteristic of liquids, solids, gases, or combinations of liquids, solids, and gases can be determined.

A "sampling hole" is a hole in a portion of a sensor card through which fluid and light can contact a fluid sensor membrane.

The term "sensed output" refers to a variable detected from a system.

The term "sensor card" refers to a rigid and/or planar component having at least one sensing membrane or sensing material of any kind disposed on, inside or integral to the "sensor card." The sensing membrane or material can contact a fluid, and produce a detectable change in response to a fluid characteristic of the fluid.

A "side of the receiving slot" refers to a position relative to a receiving slot.

A "side of a sensor surface" is any portion of a sensing material having a surface area.

A "sidewall" is a wall formed from a side of a defined chamber, compartment, feature, or structure of any type.

A "solenoid rod" is a metal rod used with an electromagnetic coil. The solenoid rod can be a switch wherein the metal rod slides along the coil axis under the influence of a magnetic field generated by the electromagnetic coil in opposite directions depending on the polarity of the magnetic field.

The term "solute concentration" refers to the amount of a first substance dissolved in a second substance.

The term "sorbent cartridge" refers to a cartridge containing one or more sorbent materials for removing specific solutes from solution. The term "sorbent cartridge" does not require the contents in the cartridge be sorbent based, and the contents of the sorbent cartridge can be any contents that can remove solutes from a dialysate. The sorbent cartridge may include any suitable amount of one or more sorbent materials. In certain instances, the term "sorbent cartridge" refers to a cartridge which includes one or more sorbent materials besides one or more other materials capable of removing solutes from dialysate. "Sorbent cartridge" can include configurations where at least some materials in the cartridge do not act by mechanisms of adsorption or absorption.

A "spectrometer" is an apparatus that measures the color spectra of light by separating light into multiple frequency bands and recording the intensity of the light in each band.

The term "temperature sensor" refers to a device for measuring the temperature of a gas or liquid in a vessel, container, or fluid line.

The term "total ammonia concentration" refers to the sum of the concentration of ammonia and the concentration of ammonium ions in a fluid.

The term "upstream" refers to a position of a first component in a flow path relative to a second component wherein fluid will pass by the first component prior to the second component during normal operation. The first component can be said to be "upstream" of the second component, while the second component is "downstream" of the first component.

Fluid Sensor Apparatus

Figure 1B:
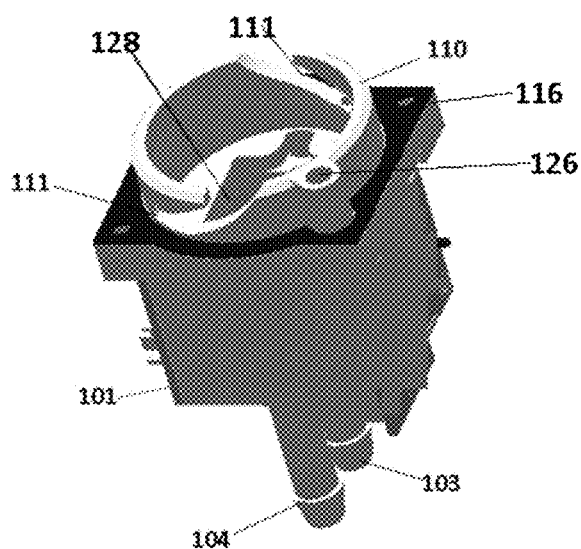
Figure 1C:
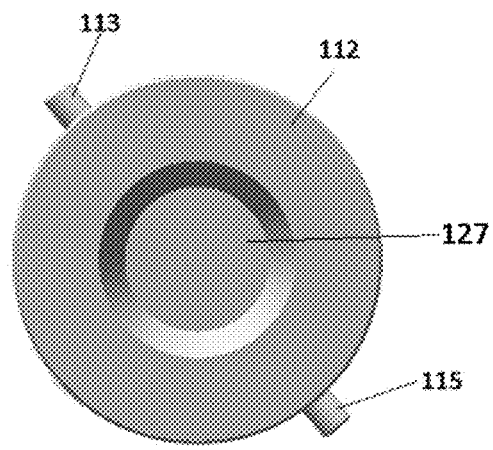
Figure 1D:
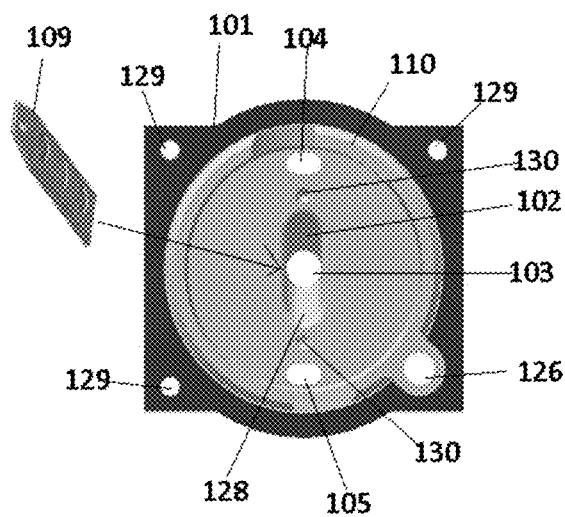
Figure 1E:
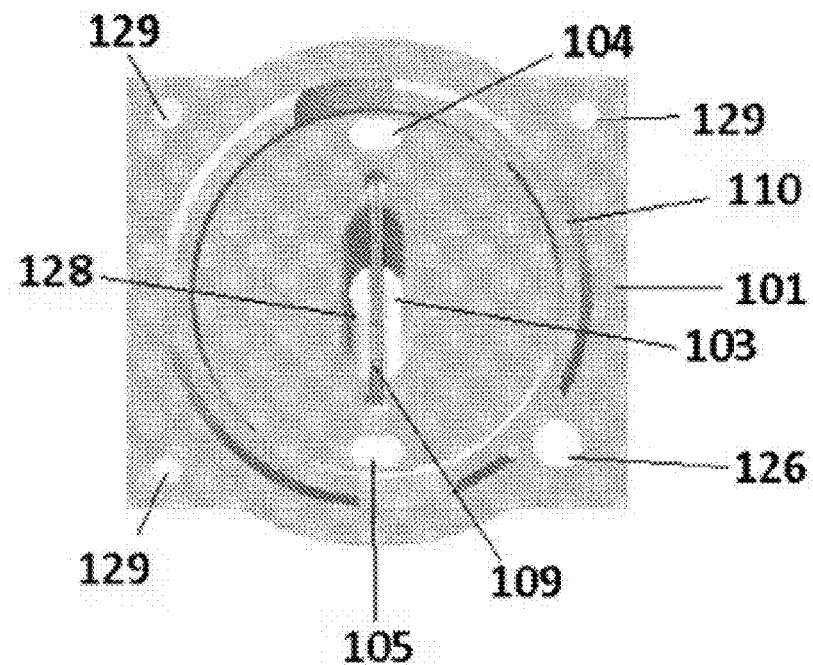
Figure 1F:
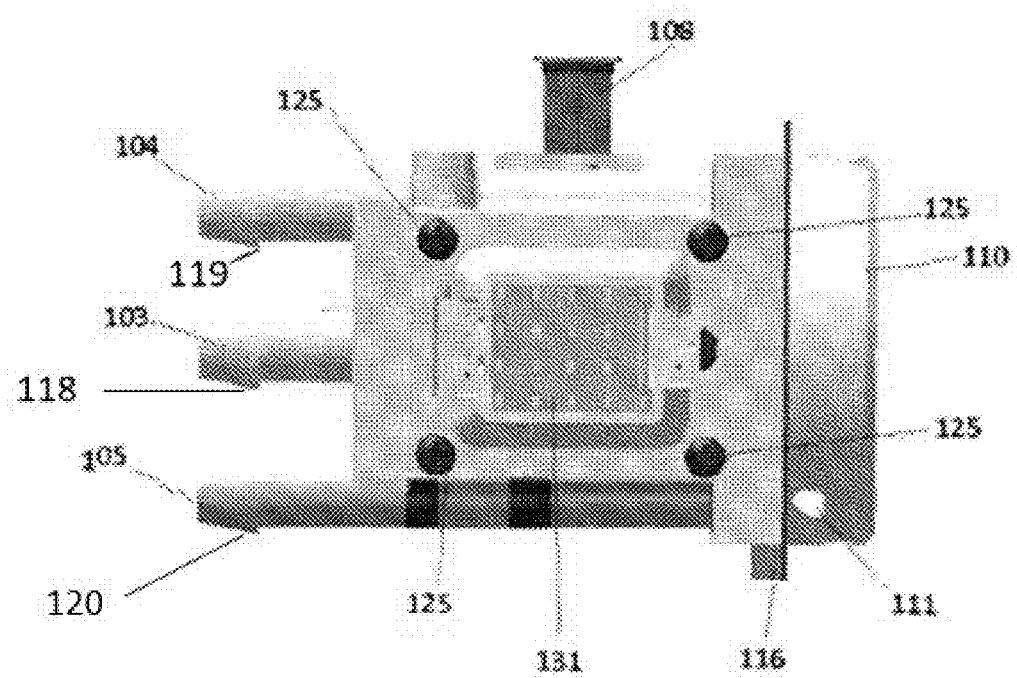

FIGS. 1A-F illustrate a non-limiting embodiment of a fluid sensor apparatus 101. FIG. 1A illustrates a side view of the fluid sensor apparatus 101; FIG. 1B illustrates a perspective view of the fluid sensor apparatus 101; FIG. 1C illustrates a receiving slot cover 112 for the fluid sensor apparatus 101; FIG. 1D illustrates a cut-away portion of the fluid sensor apparatus 101 at a specified depth and a sensor card 109 being inserted into a receiving slot 102 of the fluid sensor apparatus 101; FIG. 1E illustrates a front view of the fluid sensor apparatus 101 with the sensor card 109 inserted; and FIG. 1F illustrates a side view of the fluid sensor apparatus 101.

As shown in FIG. 1D, the fluid sensor apparatus 101 has a receiving slot 102 traversing a sampling chamber 128 along an axis. A removable sensor card 109 can be inserted into the receiving slot 102 as illustrated in FIGS. 1D and 1E to a specified depth of the fluid sensor apparatus 101. Indentations 130 on either side of the sampling chamber 128 at the depth of the fluid sensor apparatus 101 in FIG. 1D, can receive an edge of the sensor card 109, to seat or fasten the sensor card 109 in place. At a higher depth of the fluid sensor apparatus 101, a groove can be formed appurtenant to a sidewall of the sampling chamber 128 to receive a side edge of the sensor card 109. An edge of the sensor card 109 can be securely positioned in the sampling chamber 128 at a specified location or orientation with respect to a light source and/or photo detector. Alternatively, one or more grooves can be formed into the fluid sensor apparatus 101 to receive an edge of the sensor card 109 to securely position the sensor card 109 at a specified location or orientation if the sensor card 109 has a width greater than any axis of the sampling chamber 128 as shown in FIG. 1E.

Figure 3:
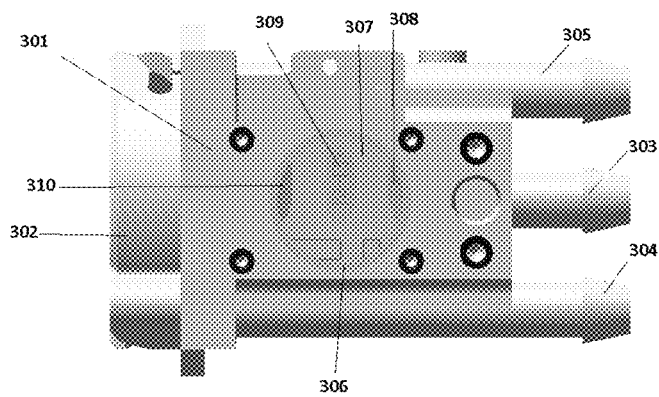
FIG. 3 shows a side view of a fluid sensor apparatus with an inserted sensor card.

The sampling chamber 128 can have a plurality of clear windows on the sidewalls as shown in FIG. 3 to provide optical access to the sensor card 109. Holes 129 formed into the body of the fluid sensor apparatus 101 can be used to attach the fluid sensor apparatus 101 to a console or system using screws or other fasteners as shown in FIG. 1D. The sampling chamber 128 extends longitudinally along a length of the receiving slot 102 of the fluid sensor apparatus 101. The receiving slot 102 can extend beyond the sampling chamber 128 and terminate in a fastening mechanism to securely hold the sensor card 109, such as the indentation 130. The sampling chamber 128 can mix fluids to improve fluid contact on the sensor card 109. Notably, the sampling chamber 128 defines a volume such that a front side and a back side of the sensor card 109 can be exposed to fluid flow on both sides of the sensor card 109. The sampled fluid can therefore simultaneously contact a first and second side (or front and back) of the sensor card 109 to advantageously increase the surface area on which fluid contacts sensing membranes in the sensor card 109. The resulting mixing can result in improved sensing of the fluid by the sensor card 109 by making the response of the sensor card to changes in the fluid faster.

The sensor card 109 can have at least a pH sensing membrane and an ammonia sensing membrane. Further, the ammonia sensing membrane can be a low sensitivity or high sensitivity membrane as described herein. The pH sensing membrane, the ammonia sensing membranes, or both can change color, optical transmittance, or change emitted fluorescent light intensity or wavelength based on a pH or ammonia level of a fluid flowing through the sampling chamber 128.

However, the sensor card is not limited to pH and ammonia sensing membranes, and can include any colorimetric material producing a detectable change in response to a concentration or other fluid characteristic of a fluid. In general, the colorimetric material can produce any visible change such as change in color or optical transmittance, or a change in emitted fluorescent light intensity or wavelength, wherein the visible change is detected by the photodetector or camera of the present invention. Non-limiting examples of colorimetric materials that can be embedded in a sensing membrane include bromothymol blue for the detection of antifreeze or other substances, lead acetate for the detection of sulfides, glucose oxidase for the detection of glucose, benzidine-type chromogens for the detection of chlorine, or any other colorimetric materials known in the art. Additional materials that can be included in the sensing membranes include ACUSTRIP 711254 for detection of antifreeze coolant in automatic transmission fluid, ACU987600 for detection of ethanol in fuel, Acustrip Metals Test® for detection of wear metals in fluid, and the Acustrip 84050 mold test for the presence of mold in a fluid, each available from Acustrip®, a New Jersey corporation. Other non-limiting colorimetric materials include materials for testing alkalinity, aluminum, ammonium, calcium, carbonate, chloride, chlorine, chlorine dioxide, chromate, color, copper, cyanide, fluoride, formaldehyde, hydrazine, iron, magnesium, manganese, nickel, nitrate, nitrite, oxygen, ozone, pH, phosphate, residual hardness, silicate, sulfate, sulfide, sulfite, total hardness, urea, and zinc, each available from EMD Millipore, a Massachusetts corporation. The sensor card can also include only a pH sensing membrane, only an ammonia sensing membrane, or a sensing membrane having any type of colorimetric material.

As described, the color change can be observed through the one or more clear windows positioned on the sidewall of the sampling chamber 128. The sensing membranes can be any material sensitive to a component of the fluid in the fluid path to be sensed. The sensing membrane has a property reacting to a fluid component that changes an optical parameter depending on the concentration of the component in the fluid or any other fluid characteristic. The optical parameter can be any one of color, reflectivity, transitivity fluorescence, adsorption, or any other parameter capable of being optically detected. In a preferred embodiment, the sensing membrane changes color in relationship to changes in the solute concentration of the measured fluid component. For example, the membrane can change color in a first direction along a color spectrum as the solute concentration of the component in the fluid increases, and along a second direction as the solute concentration of the component decreases. The color change of the membrane can be continuous and reversible in response to the component concentration. In the case of an ammonia sensing membrane, a dye can be embedded in a substrate, wherein the dye changes colors in response to an ammonia concentration of a fluid.

In one embodiment, the fluid sensor apparatus of the invention can detect pH changes of ±0.2 pH units within 10 minutes with a reliability of 95% and confidence of 95% in a pH range of around 6.8 to 7.8. The fluid sensor can also detect pH changes at any one of ±0.25 pH units, ±0.3 pH units, ±0.15 pH units, or ±0.1 pH units with reliability of >75% and confidence of >75%. The fluid sensor apparatus of the invention can also measure pH changes with an accuracy of ±0.1 pH units with a reliability of 95% and confidence of 95% in a pH range of around 6.8 to 7.8. Further, the fluid sensor can measure pH changes with an accuracy of any one of ±0.05 pH units, ±0.15 pH units, ±0.2 pH units, or ±0.3 pH units with reliability of >75% and confidence of >75%. The pH detection range can be dependent upon the dye used, and altered by changing the pH sensitive dye used in the sensor membranes of the fluid sensor apparatus. In one non-limiting example, at a total ammonia concentration range of 1 to 20 ppm, the fluid sensor apparatus of the invention can detect ±1 ppm total ammonia changes within 10 minutes with a reliability of 95% and confidence of 95% in a pH range of around 6.8 to 7.8. The fluid sensor apparatus can also detect total ammonia at any one of ±0.5 ppm, ±1.5 ppm, ±2.0 ppm, or ±2.5 ppm with reliability of >75% and confidence of >75%. The ammonia detection range can be dependent upon the ammonia sensitive dye used, and can be altered by changing the ammonia sensitive dye. At a total ammonia concentration range of 1 to 5 ppm, the fluid sensor apparatus of the invention can measure total ammonia concentration with an accuracy of ±0.2 ppm total ammonia changes within 10 minutes with a reliability of 95% and confidence of 95% in a pH range of around 6.8 to 7.8. Alternatively, the fluid sensor can measure total ammonia concentration with an accuracy at any one of ±0.5 ppm, ±1.5 ppm, ±2.0 ppm, or ±2.5 ppm with reliability of >75% and confidence of >75%. Temperature probe 122 can determine the temperature of the fluid within the fluid sensor apparatus 101 for determination of total ammonia content based on the ammonia concentration and pH. Electrical connector 124 provides the electrical connection from the temperature probe 122 to the fluid sensor apparatus 101. The fluid sensor apparatus is not limited to detection of pH and/or ammonia, and can detect any substance that can produce a detectable change in a substrate on a sensor card. Any colorimetric material can be included in the sensor card for detection of any substance.

In FIG. 1F, one non-limiting example of a light source is shown as LED array 131 connected to the system by electrical connector 117. The LED array 131 can shine a light onto a first side of the sensor card 109 seated inside the receiving slot 102. The light can be directed through the one or more clear windows in the sidewall of the sampling chamber 128. The light source can be any source of light at any wavelength capable of shining light onto the sensor card 109. In a preferred embodiment, the LED provides white light; however, any color or wavelength of light can be used. In a preferred embodiment, the light source provides uniform backlighting onto one side of the sensor card 109 such that a camera 106 (shown in FIG. 1A) positioned on an opposite side of the fluid sensor apparatus 101 can detect changes on an opposite side of the sensor card 109 via one or more clear windows. However, the LED array 131 can be positioned at any part of the apparatus capable of providing uniform light to the sensor card 109, including direct and side-firing or side-emitting LEDs. Importantly, light can be transmitted through the sensor card 109 and detected on an opposite side on which light is cast. In general, the clear windows for the LED array 131 and camera 106 can be antipodal to each other.

The camera 106 can be a complementary metal oxide semiconductor (CMOS) with an image sensor that has a photodiode and a CMOS transistor switch for each pixel, allowing the pixel signals to be amplified individually. By operating the matrix of switches, the pixel signals can be accessed directly and sequentially. Alternatively, the camera 106 can be a charge-coupled device (CCD) integrated circuit, or other imaging technology as known in the art.

In a preferred embodiment, the light is uniformly cast onto the sensor card 109. Such uniform lighting provided by an ordered arrangement of light sources can result in uniform or even backlighting onto the sensor card 109. The luminous intensity of the light on each sensing membrane can also be uniform, meaning that the power of the light emitted by the LED array in each direction to each sensing membrane is uniform. The luminous flux, or the quantity of energy of the light transmitted onto each sensing membrane, can also be uniform, as can the illuminance, or luminous flux per area of the sensing membranes. The uniform lighting can be an ordered array of light sources, or a single homogenous light source that casts even lighting onto a surface. Diffuser films and a light cavity can also be included to provide uniform lighting. Diffuser films are thin films that evenly distribute transmitted light. Non-limiting examples of diffuser films include Brightness Enhancement Film (BEF), Dual Brightness Enhancement Film (DBEF), and Universal Diffuser Film 50 (UDF 50), available from 3M™, a Minnesota corporation. A light cavity is an arrangement of mirrors or other reflectors, such as white surfaces, that form standing waves from light. Advantageously, uniform backlighting can improve accuracy of the sensed color changes on the sensor card 109. The clear windows can be similarly positioned uniformly or in a pattern on the sidewalls to receive the uniform light dispersion. For example, the lights on the LED array 131 can be arranged in any shape, including rectangular, circular, or other shape, to cast light onto the sensor card 109 in a desired dispersion. The sensing membranes can then be positioned on the sensor card 109 to align with light cast by the LED array 131. Further, the power supply for the LED array 131 can provide a stable current and voltage to increase light uniformity.

Although illustrated as opposing the camera, the LED array 131 can be positioned anywhere on the fluid sensor apparatus 101, including on any side of the fluid sensor apparatus 101. A light guide can be included to allow light from an LED array positioned on a side of the fluid sensor apparatus 101 to be transmitted through the sensor card and onto the camera along any reflectance pathway. For example, a mirror arrangement can guide light to the camera such that the camera need not be in directly positioned opposite to the light source. The light guide can provide a reflectance pathway such that the camera can be positioned in any convenient location to receive the reflected light. Similarly, the LEDs or any light source can rely on a light guide to direct light such that light sources can be conveniently positioned at any position, and need not be opposedly positioned to the camera. In one embodiment, both the light source and the camera transmit and receive light, respectively, using a light guide. The backlight settings can be computer controlled to optimize the backlight for each sensor membrane. The light from the LED array can be set at a first intensity, optimized for a first sensor membrane. The LED can then be switched to a second intensity, optimized for a second sensor membrane. The camera can take an image of each sensor membrane at the optimized backlighting.

In FIGS. 1A and F, the camera 106 and LED array 131 can be placed on opposing sides of the receiving slot 102 to help reduce hot spots formed on the sensor card 109. The light source shown as the LED array 131 and the photo camera described as camera 106 can be positioned opposite to each other on a line or plane that is substantially orthogonal to the receiving slot 102 containing the sensor card 109. A grating light valve (not shown) having an adjustable diffraction grating can be included to control the intensity of light diffracted onto the camera 106. The diffraction grating can be a set of equally spaced, narrow, parallel grates. The grates can disperse the light at different wavelengths, so that light intensity can be measured as a function of a particular wavelength. One or more light diffusive layers can also be included to diffuse the light shining on the sensing material of the sensor card 109 prior to detection by the camera 106. The clear windows can be free from scratches that degrade the sensor performance. In one non-limiting embodiment, to reduce scratches to the clear windows, the windows can be solvent polished. As shown in FIG. 1F, the camera 106 can transmit the image or other sensed output to a processor (not shown) in electronic communication with the camera 106 via electronic link 108.

As described further below, the processor can determine the color of the pH sensing membrane and ammonia sensing membrane to determine the pH and/or ammonia level, or the concentration of any solutes or ions, in the fluid flowing through the fluid sensor apparatus 101 based on the sensed output. Electronics 107 of FIG. 1A can control the camera 106 and the light source. Although illustrated as having wired communication links between the camera, electronics, and processor, one of skill in the art will understand that any method of transmitting and receiving data can be used, including Bluetooth, Wi-Fi, or any other methods known in the art. The processor can receive data, and in particular the image produced by the camera, and determine the intensity of the pixels of a particular color in an image of the sensing membranes. The processor can be housed within, or positioned outside of, the fluid sensor apparatus 101. The camera 106 can be operated under manual control or by a software application for controlling the exposure, gain, and white balance.

As shown in FIG. 1A, fluid can enter the fluid sensor apparatus 101 through a fluid inlet 103 and into the sampling chamber 128 of FIG. 1D. The fluid contacts the sensor card 109 seated in the receiving slot 102 of the sampling chamber 128. The fluid can then exit the sampling chamber 128 through fluid outlets 104 and 105. The fluid outlets 104 and 105 and the fluid inlet 103 can be both positioned on the same side of the sampling chamber 128 to provide a curved fluid flow path such that fluid can enter through the fluid inlet 103 positioned in between fluid outlets 104 and 105 wherein fluid then flows into a first end of the sampling chamber 128 and flows in a curved flow path and out a second end of the sampling chamber 128 and into the two fluid outlets 104 and 105 positioned on the same side as the sampling chamber 128. Conversely, the two fluid outlets 104 and 105 can be used as inlets to introduce fluid into sampling chamber 128 along a curved flow path such that fluid flows into and out of the fluid inlet 103. One of skill in the art will understand that one or more fluid inlets and outlets can be used. In a preferred embodiment, the two fluid outlets 104 and 105 advantageously improve fluid contact of the sensing membrane of the sensor card 109. Notch 118 on fluid inlet 103, notch 119 on outlet 104, and notch 120 on outlet 105 can provide secured fastening of the fluid inlet 103 and fluid outlets 104 and 105 to tubing as needed.

In FIG. 1C, the receiving slot 102 can include additional components to ensure that the detachable receiving slot cover 112 fits tightly over the receiving slot 102 and does not move as fluid is flowed into and through the sampling chamber 128. As illustrated in FIGS. 1A and 1B, the receiving slot 102 can have an extended portion 110 that will contact the receiving slot cover 112 when closed. The extended portion 110 can include grooves 111 and 114 for receiving pins 113 and 115 when the receiving slot cover 112 is placed over the receiving slot 102. The receiving pins 113 and 115 engage with the grooves 111 to ensure the receiving slot cover 112 is properly placed and securely fastened on the fluid sensor apparatus 101.

To improve accurate measurements of pH and/or solute concentration, the sensor card 109 can be fixed into a specified position and/or orientation inside the receiving slot 102 to resist any movement due to the flow of the fluid. Any suitable fastener to fix the receiving slot cover 112 to the fluid sensor apparatus 101 is contemplated. Magnets can be placed within the receiving slot cover 112 and the fluid sensor apparatus 101 to determine whether the receiving slot cover is in the proper position. If the receiving slot cover 112 is closed, the magnets can provide a means to determine if cover 112 is closed over the receiving slot 102 on the fluid sensor apparatus 101. As shown in FIG. 1F, overhang 116 can provide support for the receiving slot cover 112 when closed. In FIGS. 1D and 1E, opening 126 on extended portion 110 can provide for a fastener to be inserted through the receiving slot cover 112 to secure the receiving slot cover 112 onto the fluid sensor apparatus 101.

In FIG. 1C, an annular bevel 127 can be formed on the receiving slot cover 112 to capture the sensor card and hold the sensor card securely locked in the sensor apparatus 101. Screws 125 fasten the electronics and camera 106 to the fluid sensor apparatus 101. Alternative methods of securing components to the fluid sensor apparatus 101 can be used, including adhesive, glue, bolts, or any other securing components known in the art. Holes 123 allow additional components and electronics to be added to the fluid sensor apparatus 101.

Figure 2:
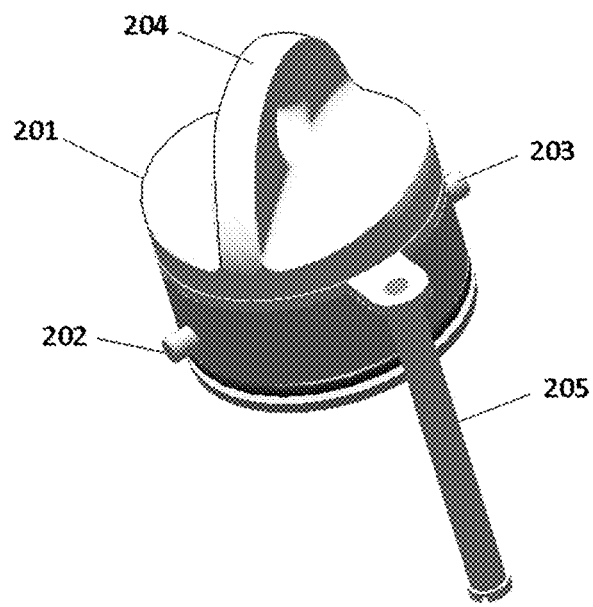
FIG. 2 shows a perspective view of a receiving slot cover for a fluid sensor apparatus.

FIG. 2 illustrates a close-up view of a receiving slot cover 201 of the fluid sensor apparatus 101. As described, the receiving slot cover 201 can include pins 202 and 203 to hold the receiving slot cover 201 in place on the fluid sensor apparatus 101 (FIG. 1A). The receiving slot cover 201 can also include a handle 204 to facilitate twisting of the receiving slot cover 201 for attachment and detachment of the receiving slot cover 201 to the fluid sensor apparatus 101. A sliding rod 205 can be included as a means to secure the receiving slot cover 201 when the receiving slot cover is open on the fluid sensor apparatus 101 and to prevent the cover from being removed during use. Once inserted, the sensor card can be fixed regarding the receiving slot cover 201 to ensure that the sensor card does not move within the receiving slot 102 of FIG. 1D as fluid flows over the sensor card. Alternatively, the sliding rod 205 can be attached to the fluid sensor apparatus 101 and inserted into a hole on the receiving slot cover 201. Fixing the sensor card within the fluid sensor apparatus 101 provides the camera 106 (FIG. 1A) with a constant focal length, increasing the accuracy of the sensor. Additionally, the annular bevel 127 (FIG. 1C) can be included on an interior surface of the receiving slot cover 201 for fixing the sensor card in place. The sensor card can be inserted into the bevel to lock the sensor card in a fixed position and to prevent insertion of the sensor card at a 180° rotation from the intended configuration. The bevel only allows the sensor card to be inserted into the fluid sensor apparatus in a single configuration. The bevel can be sized and shaped to conform to an edge of the sensor card, fixing the sensor card in position when placed into the bevel. The distance from the sensor card to the camera 106 can be any length, including between 15 and 20 mm. The camera lens can be configured with a focal length equal to the fixed distance between the camera 106 and sensor card.

FIG. 3 illustrates a side view of the fluid sensor apparatus with the camera 106 of FIG. 1A removed. Fluid enters the fluid sensor apparatus 301 through fluid inlet 303, and exits through fluid outlets 304 and 305. The fluid inlet 303 and two fluid outlets 304 and 305 can provide uniform flow and increase fluid contact to the sensor card 307. The sensor card 307 can then be inserted into a receiving slot within the fluid sensor apparatus 301. A receiving slot cover (not shown) fits over an extended portion 302 of the fluid sensor apparatus 301 fixing the sensor card 307 in a fixed position. A clear window 306 is positioned on a sidewall of the sampling chamber to provide optical access to the sensor card 307. A camera (not shown) is placed outside of the clear window 306 to capture the light transmitted through the fluid sensor apparatus 301 through a second clear window (not shown) positioned antipodal to the clear window 306 aligned over an opposite side of the sensor card 307. The camera can also be positioned within the fluid sensor apparatus 301. Optionally, a waterproof camera can be used having components that are sealed to prevent damage to the camera from the fluid circulating inside the fluid sensor apparatus 301. An LED array or other light source can shine light through the second clear window and the sensor card 307, which is then detected by the camera and correlated to a pH and/or ammonia level in the fluid. In another embodiment, the use of one or more clear windows can be avoided by positioning a lens portion of the camera to be in direct contact with fluid circulating inside the fluid sensor apparatus 301. Portions of the camera can be waterproof to avoid damage; particularly, a portion of a camera lens contacting fluid can be sealed from a portion of the camera containing electronics and componentry. The sensor card 307 can include one or more sensing membranes, including any colorimetric material. In one non-limiting embodiment, the sensor card can include a low sensitivity ammonia sensing membrane 308, high sensitivity ammonia sensing membrane 309 and pH sensing membrane 310.

The camera detects data, such as the transmitted light, and a processor correlates the transmitted light to a pH or ammonia level, as described further below. As illustrated in FIG. 3, the light source and camera can form a line that is substantially orthogonal to the receiving slot containing the sensor card with the light source and camera on opposite sides of the sensor card. Three points can also be used to define a plane that is substantially orthogonal to the receiving slot containing the sensor card with the light source and camera on opposite sides of the sensor card. Placing the light source and camera on opposite sides of the sensor card helps eliminate hot spots formed on the sensor card, increasing the accuracy of detection. Accuracy of the sensor can also be improved by making any portion of the interior surface of the receiving slot and/or sampling chamber non-reflective. Similarly, the sensor card surfaces can also be non-reflective to improve accuracy and related light detection properties. The interior surface of the receiving slot, the sampling chamber, and/or the sensor card can be constructed or covered in a non-reflective material or colored in a non-reflective color, such as black.

The removable sensor card can be a disposable sensor card for use with a non-disposable fluid sensor apparatus. After each use, or if the sensor card is past useful life, the sensor card can be removed from the fluid sensor apparatus and replaced with a new sensor card. A disposable sensor card may be used, for example, in medical applications for sanitary reasons. Where a non-disposable fluid sensor apparatus is cleaned between uses, such as by a disinfection routine that may damage a sensor card, a disposable sensor card may be used.

Figure 4:
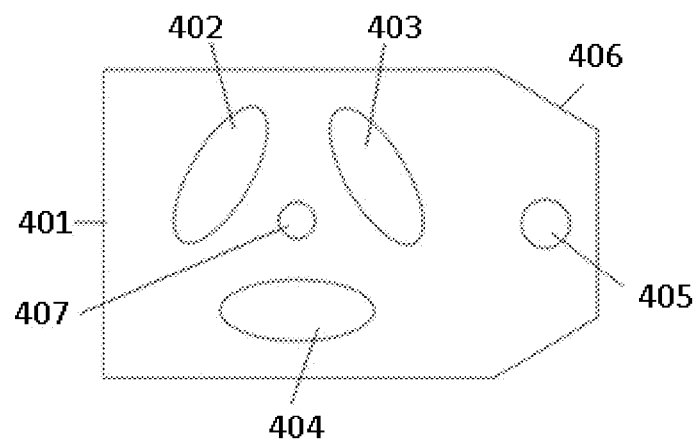
FIG. 4 shows a top view of a sensor card for use with a fluid sensor apparatus.

FIG. 4 illustrates a non-limiting embodiment of a sensor card 401 for use with the fluid sensor apparatus. The sensor card 401 can have three sensing membranes containing a colorimetric material. The sensing membranes can include any colorimetric material, including a high sensitivity ammonia sensing membrane 402, a low sensitivity ammonia sensing membrane 403, and a pH sensing membrane 404. The sensor card 401 can also include a reference sensing region 407. One of skill in the art will understand that any number of sensing membranes can be included in the sensor card, including 1, 2, 3, 4, 5, 6, or more sensing membranes of any type. Multiple sensing membranes of the same type can provide redundancy and further accuracy. As described, the sensor card 401 can include a hole 405 for equalizing pressure when fluid flows across both sides of the sensor card 401. The sensor card 401 can also have at least one tapered edge 406. As described, the tapered edge 406 can fit within a bevel in the receiving slot or receiving slot cover of the fluid sensor apparatus, further fixing the sensor card 401 in place.

Figure 5:
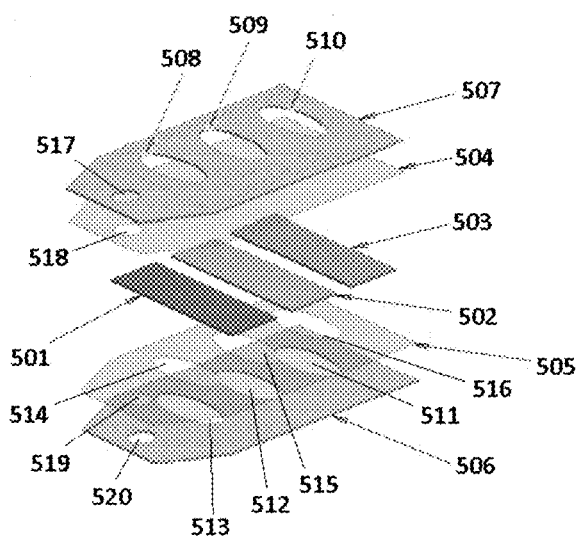
FIG. 5 shows an exploded view of a sensor card.

FIG. 5 illustrates an exploded view of a sensor card for use with the fluid sensor apparatus. The sensor card can include one or more sensing membranes, which can include any colorimetric material, including a high sensitivity ammonia sensing membrane 501, a low sensitivity ammonia sensing membrane 502, and a pH sensing membrane 503. The sensing membranes can have a dye embedded in or chemically bound to a substrate, the dye changing color in response to the pH or ammonia level of a fluid. The substrate can be any substrate known in the art capable of allowing gaseous ammonia through the substrate to contact the embedded dye, including polytetrafluoroethylene (PTFE), polyvinylidene difluoride (PVDF) and other fluorinated, hydrophobic polymers such as fluorinated ethylene propylene (FEP), and ethylene tetrafluoroethylene (ETFE). The gaseous ammonia penetrates the substrate and contacts the dye, altering the color of the dye. The ammonia sensitive dye can be any dye capable of changing color in response to the ammonia level, including bromophenol-blue, bromocreosol green, thymol blue, methyl crystal purple, chlorophenol, free-base porphyrins, Tetraphenylporphyrin (H2TPP), and combinations thereof. The pH sensitive dye can include Bromocresol Purple, Bromothymol Blue, Phenol Red, Thymol Blue, or combinations thereof.

The fluid sensor apparatus is not limited to use with sensor cards or sensor strips, and can be used with any substance that can produce a detectable change when exposed to a particular substance. The fluid sensor apparatus can detect color changes of the fluid flowing through the fluid sensor apparatus to determine if a chemical change occurs within the fluid, or to determine changes in the fluid composition. The fluid sensor apparatus can also be used to sense the clarity or color of the fluid.

The sensing membranes can be placed between adhesive layer 504 and adhesive layer 505 interposed between a front carrier 507 and a back carrier 506, which overlay a front side and back side of the sensor card, respectively. The adhesive layers affix the sensing membranes to a front carrier 507 and back carrier 506. The adhesive layers and front and back carriers can include sampling holes to allow fluid to contact the fluid sensor membranes. The fluid sensor membrane can also detect gas and combinations of gases dissolved in the fluid. Although the term "fluid" is used in "fluid sensor membrane," the "fluid sensor membrane" is not limited to use with just fluids, but can also be used for gases and gases dissolved in fluid.

Sampling holes 508, 509, and 510 in front carrier 507 allow light and fluid to pass through the front carrier 507. Sampling holes 511, 512, and 513 allow light and fluid to pass through back carrier 506. Cut-outs 514, 515, and 516 allow light and fluid to pass through adhesive layer 505. Although not shown in FIG. 5, adhesive layer 504 also has cut-outs aligned with the fluid sensor membranes and sampling holes. As described, the sampling holes and cut-outs can be any shape, and need not be the same shape as the fluid sensor membranes. A hole can penetrate each layer of the sensor card, shown as hole 517 in front carrier 507, pressure equalizing hole 518 in adhesive layer 504, pressure equalizing hole 519 in adhesive layer 505, and pressure equalizing hole 520 in back carrier 506. As described the hole 517 acts to equalize pressure on both sides of the sensor card when fluid is flowing over both sides of the sensor card.

As described, the ammonia sensing region can sense an amount of ammonia in a fluid by sensing the amount of gaseous ammonia ($NH_3$) contacting the sensing membrane. The total ammonia concentration of the fluid includes ammonia as well as ammonium ions ($NH_4^+$). In certain fluids such as dialysate, the ammonium ions can account for the majority of the total ammonia in fluid. The $pK_a$ of ammonia depends on the temperature of the fluid and can be determined by a person skilled in the art for any temperature. With a known temperature, pH, and ammonia concentration, the ammonium ion concentration can be calculated using the Henderson-Hasselbalch equation. A temperature sensor can be included in the fluid sensing apparatus of the present invention. For example, a temperature sensor can be disposed in the sampling chamber of the described fluid sensor apparatus to allow for calculation of total ammonia. Alternatively, a temperature sensor can be positioned either upstream or downstream of the fluid sensor apparatus in a fluid flow path to obtain a temperature reading. One of skill in the art will understand that the processor can determine the total ammonia concentration of the fluid based on the sensed ammonia concentration, the temperature, and the pH.

Figure 6:
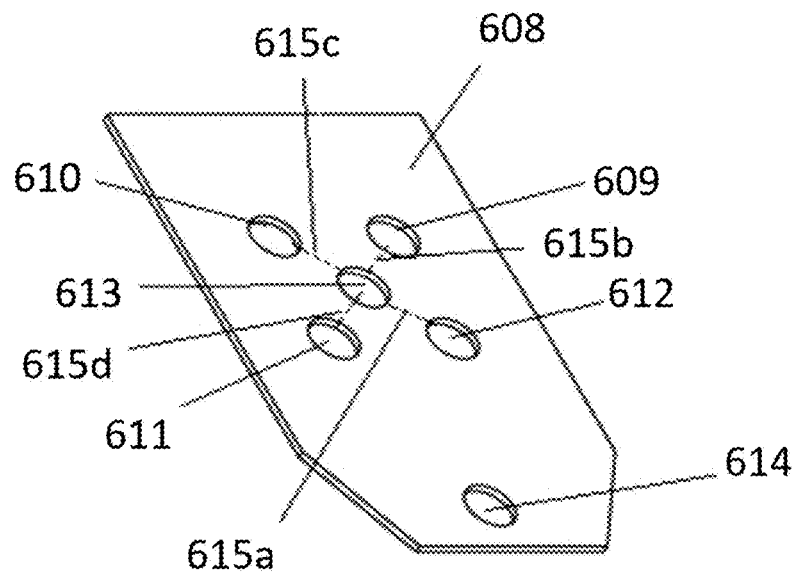
FIG. 6 shows a non-limiting embodiment of a sensor card.

FIG. 6 illustrates a sensor card 608 with four sampling holes 609, 610, 611, and 612 positioned symmetrically around axis perpendicular to the sensor card 608 and equidistant from the axis, as shown by dashed lines 615a, 615b, 615c, and 615d. Optional reference sensing region 613 can be included at any location. A pressure equalizing hole 614 can be included equalize the fluid pressure on each side of the sensor card 608 in the sensor apparatus. Any number of sampling holes can be included in any sensor card, including 2, 3, 4, 5, 6, 7, or more.

Figure 7:
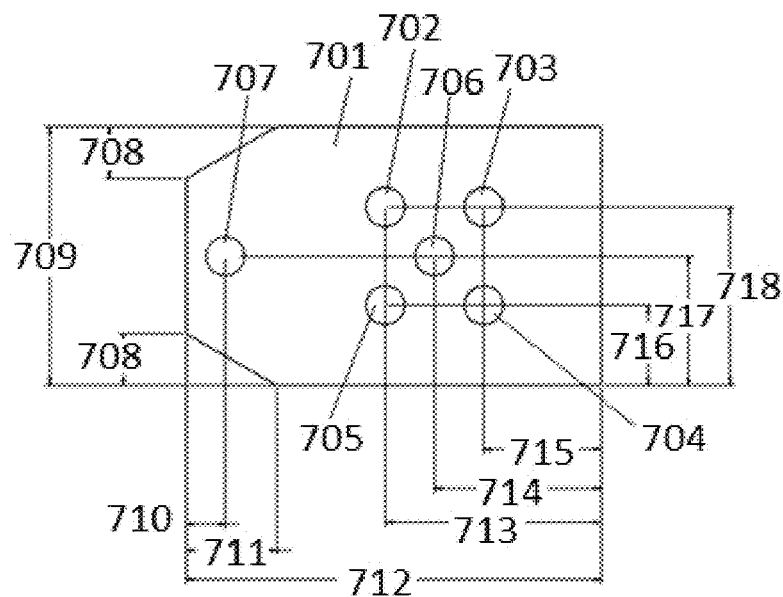
FIG. 7 shows a schematic of a sensor card.

FIG. 7 illustrates a non-limiting schematic of a sensor card 701. The sensor card 701 can include four sampling holes 702, 703, 704, and 705, as well as reference sensing region 706. Alternatively, each of 702, 703, 704, 705, and 706 can each be sampling holes, with a separate reference sensing region optionally provided. Further, any number of sampling holes and reference sensing regions can be included. For example, the sensor card 701 can have two reference sensing regions and three sampling holes, three reference sensing regions and two sampling holes, or four reference sensing regions and one sampling hole. The sampling holes can overlay fluid sensor membranes or other colorimetric materials disposed inside the sensor card 701, including a high sensitivity ammonia sensor membrane, a low sensitivity ammonia sensor membrane, and a pH sensor membrane, or any combination thereof. One of skill in the art will understand that the order of the fluid sensor membranes can be changed. Pressure equalizing hole 707 can equalize the fluid pressure on either side of the sensor card during use. The sensor card can be any length, shown as distance 712, including between 16 and 48 mm. The sensor card can be any width, shown as distance 709, including between 10 and 30 mm. The sensor card 701 can include at least one tapered edge, tapering inwardly along a side of the sensor card. The tapered edge can begin any distance from the end of the sensor card 701, shown as distance 711, including between 3.5 and 10.5 mm from the end of the sensor card 701. The tapered edge can taper to any degree, shown as distance 708, including between 2.0 and 6.0 mm from the side of the sensor card 701. The pressure equalizing hole 707 can be any distance from the end of the sensor card 701, shown as distance 710, including between 1.5 and 4.5 mm from the edge of the sensor card 701.

The sensor card 701 can include each of the sampling holes 702-705 concentrically arranged about an axis perpendicular to the sensor card 701, with the reference sensing region 706 at the axis. The sampling holes 702 and 705 can be any distance from the bottom of the sensor card, shown as distances 713 and 715, including between 25 and 8.0 mm. The reference sensing region 706 can be any distance from the bottom of the sensor card, shown as distance 714, including between 19 and 6.5 mm. The sampling holes 703 and 704 can be any distance from the bottom of the sensor card, shown as distance 713, including between 4.5 and 13.6 mm. Sampling holes 704 and 705 can be positioned any distance from the side of the sensor card, shown as distance 716, including between 3.1 and 9.3 mm. The reference sensing region 706 can be positioned any distance from the side of the sensor card, shown as distance 717, including between 5.0 and 15.0 mm. Sampling holes 702 and 703 can be positioned any distance from the side of the sensor card, shown as distance 718, including between 21 and 6.9 mm.

The fluid sensor apparatus can be used in any application where accurate measurement of solute concentrations, such as pH and/or ammonia level, is needed. The fluid sensor apparatus can measure the pH and/or solute level of a fluid either continuously or intermittently. The fluid sensor apparatus can be fluidly connected to a fluid flow path, and images of the sensing membranes can be taken by the camera as needed. Where the fluid is gaseous, the fluid flow path may be a gas chamber, a ventilation path, or other flow path for the movement or containment of gas. For example, the fluid sensor apparatus may include means to divert a patient's exhalation into the imaging path for sensing as described.

The fluid sensor apparatus can also be used to optically sample a fluid to determine a color, clarity, or cloudiness of the fluid. The sensor card can be removed to only have fluid flowing through the sensor apparatus. Alternatively, the fluid sensor apparatus can be constructed without a receiving slot for a sensor card, and only used for determining the color, clarity, and/or cloudiness of a fluid.

When used without a sensor card, the light source can emit light through the fluid sensor apparatus, and the light can be detected by a photodetector or camera on the opposite side of the fluid sensor apparatus. The color or clarity of a fluid sample can be obtained by transmitting radiant light or energy into the sample and then detecting the radiant light or energy after the light or energy has passed through a portion of the sample. For example, wavelengths of light emitted through the fluid and detected by the camera can determine the color of the fluid. If white light is emitted through the fluid, a detected decrease in the amount of red light on the opposite side of the fluid would indicate that red light is either being reflected or absorbed by the fluid. Based on the wavelengths of visible or non-visible light emitted and detected, the color of the fluid can be determined. A decrease in intensity of light from the light source to the camera can determine the clarity or cloudiness of the fluid. For example, if the detected light has an intensity 10% lower than the emitted light, the fluid absorbs or reflects 10% of the emitted light, indicating a lack of clarity or cloudiness in the fluid. Any change in intensity of light can be detected including a change of between 1 and 50%, between 1 and 5%, between 1 and 10%, between 5 and 10%, between 5 and 20%, between 10 and 25%, between 15 and 30%, between 15 and 40% or between 25 and 50%.

The color spectrum, clarity, and cloudiness of a fluid can be of particular use in peritoneal dialysis. A lack of clarity or cloudiness in peritoneal dialysate effluent drained from a patient may indicate infection in the peritoneum of the patient. Abnormal discoloration of the peritoneal dialysate effluent can also indicate protein or blood cell leakage through the peritoneal membrane of the patient, as well as fibrin in the peritoneum or increased triglycerides in the filtrate. In response to an abnormal discoloration or lack of clarity in the peritoneal dialysate effluent, a doctor or patient may be alerted to the possibility of infection or issues. An effluent line of a peritoneal dialysis cycler can be fluidly connected to the inlet of the fluid sensor apparatus, and the peritoneal dialysate effluent flowed through the fluid sensor apparatus to determine the color, clarity, or cloudiness of the fluid.

The color of the fluid can also be used as a quality check. For example, a discolored or cloudy fluid used in peritoneal dialysis could indicate that the composition of the fluid is incorrect. In response to an unexpected fluid composition, the system can alert the user or shut down to avoid infusing peritoneal dialysate having an incorrect composition into the patient. Further, based on the color of the fluid, the composition of the fluid can be determined. The processor can compare the expected composition to the actual determined composition and issue an alert or shut down if the determined composition of the fluid differs from the expected composition of the fluid by more than a predetermined amount.

Color Calibration

Figure 8:
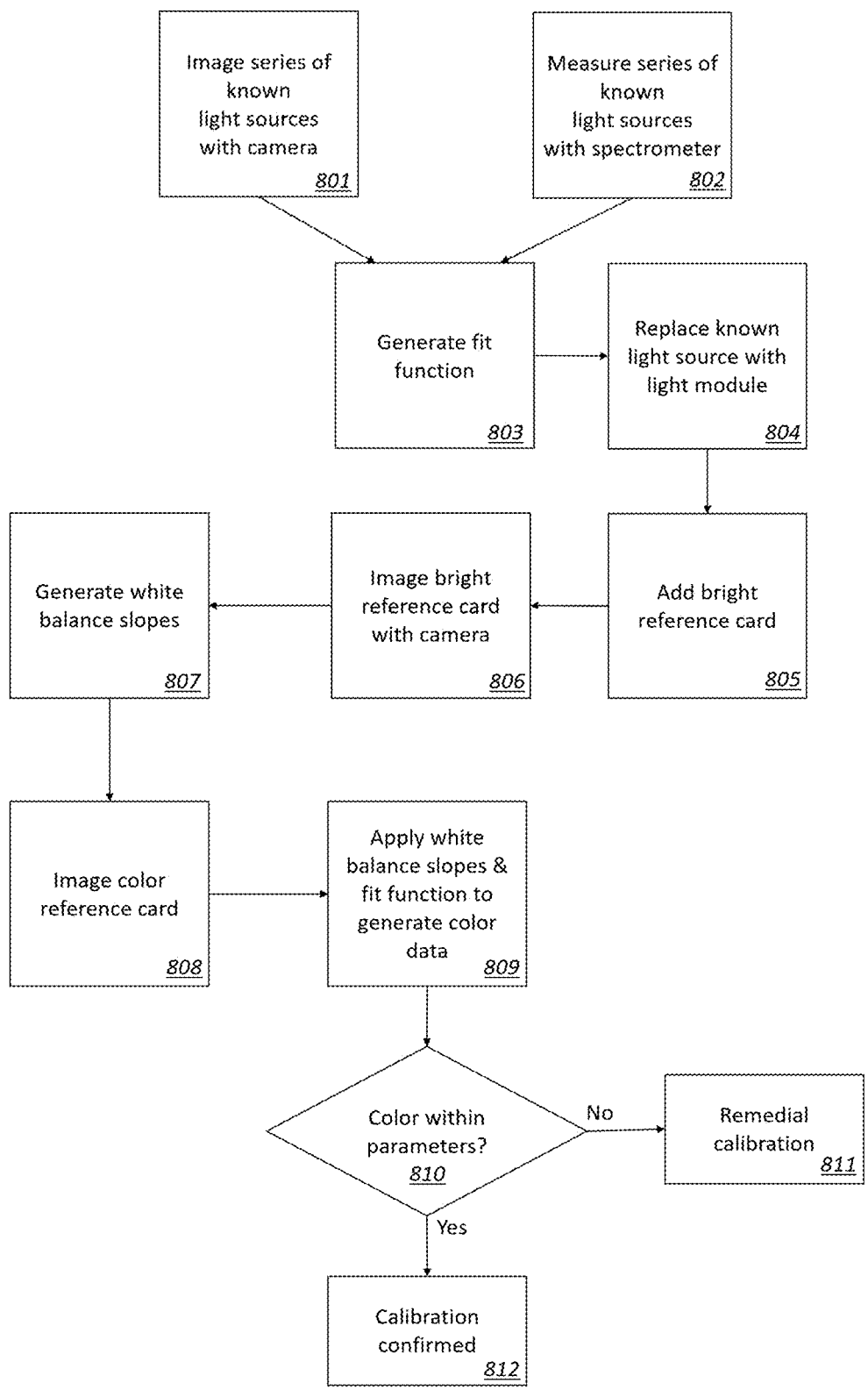
FIG. 8 is a flow chart showing steps for calibrating a fluid sensor apparatus.

FIG. 8 describes the steps for calibrating a camera to act within a fluid sensor apparatus as described. In steps 801 and 802, known light sources are used to correlate the camera with a spectrometer.

In some embodiments, the known light sources may be tuneable lights of greater precision than that of the sensor being calibrated. Because a single set of light sources can be used to calibrate each unit of a manufactured device in turn, more exact and costly light sources may be provided for this calibration step than the light module coupled to the device.

Similarly, in some embodiments, the spectrometer used in step 802 and in further steps below may exceed the cost of the components of each individual apparatus, but is cost-effective to correlate with each unit as part of a manufacturing process for multiple units.

In some implementations of the described process, step 802 may not occur each time that a new camera is correlated, but may instead occur once in conjunction with multiple instances of unit calibrations. For example, if it is found that the known light source consistently produces the same spectra when measured by the spectrometer over multiple unit calibrations without appreciable variation, then stored values for these spectra may be used with calibrations. As it is the reliability of the spectrometer and the known light source, versus the suspected variance of the camera and/or light module, that motivates these calibration steps, one of ordinary skill in the art will recognize the reusability of one data set when applied uniquely to the other.

Because spectral color data from the spectrometer is used as the basis for calibration of the camera units, it is important to safeguard the accuracy of the spectrometer itself. Periodic tests can be carried out to assure that the spectrometer's measurement of light sources and/or sensor strips are within an expected range. The system can be configured to provide warnings and/or halt a calibration process when the spectrometer's own data is suspect.

At step 803, a fit function is generated based on the recorded data. An exemplary process for carrying out the fit function is described below and illustrated in FIG. 9. The fit function uses the spectrographic color data as reference values, correcting the spectra produced by the camera.

In step 804, the known light source is replaced with the light module that will be used as part of the sensor device. In some embodiments, the light module may include an LED light source that is affixed to a housing to provide a constant illumination and light profile for purposes of consistent calibration and later measurement. Pre-conditioning of the light module may be performed before calibration to assure that the conditions of calibration more closely match the conditions of use; for example, the LED light source may be activated prior to calibration to allow it to "warm up" to a similar state at which it will usually run, or to allow any ongoing effects of use to "burn in" to the LED array.

In some embodiments, the sensor device will be used with aqueous solutions, and so white balancing and confirmation steps are performed with the module being "wet". If so, liquid is added to the module. This may be distilled water, isopropyl alcohol, or any other liquid with known properties for purposes of the calibration process. In some embodiments, differing liquids to can be added to the module during different steps of the calibration procedure, allowing the calibration itself to include one or more steps where a known sample is assayed. In other embodiments, these steps may be performed "dry," or without the presence of liquid added to the module.

At step 805, a bright reference card is added. The reference card may be a strip of chemical sensing material of a known type, or may be one or more bright colors with a known relationship to colors used in chemical sensing within the device.

At step 806, images of the bright reference card are taken with the camera. At step 807, by comparing the actual intensity values returned in these images to the expected maximal intensity values associated with the reference cards, the system generates white balance slopes characteristic of the light source and camera.

Steps 808-812 verify the calibration by use of one or more reference cards. In step 808, the camera records an image of the reference card, which may be a card of known color or may, instead, involve a sensor film and a fluid specimen of known properties. As described below with respect to FIG. 11 and the use of the device, the images are used to generate color spectra, which is then corrected by the fit function. At step 809, white balance slopes and a fit function are applied to the spectra. At step 810, the corrected color spectra are then compared to known parameters. Further calibration is needed if the comparison fails at step 811; otherwise, the calibration can be considered complete at step 812.

Fit Function

The calibration process as described above may be carried out first when the sensing device is manufactured, and then later when maintaining the device or after a particular time period has passed in order to assure the device accuracy. As part of the calibration process, images of a known light source and a bright reference card are taken. Spectral measurements are also taken of the known light sources and bright reference card, as well as of the backlight associated with the light module.

Figure 9:
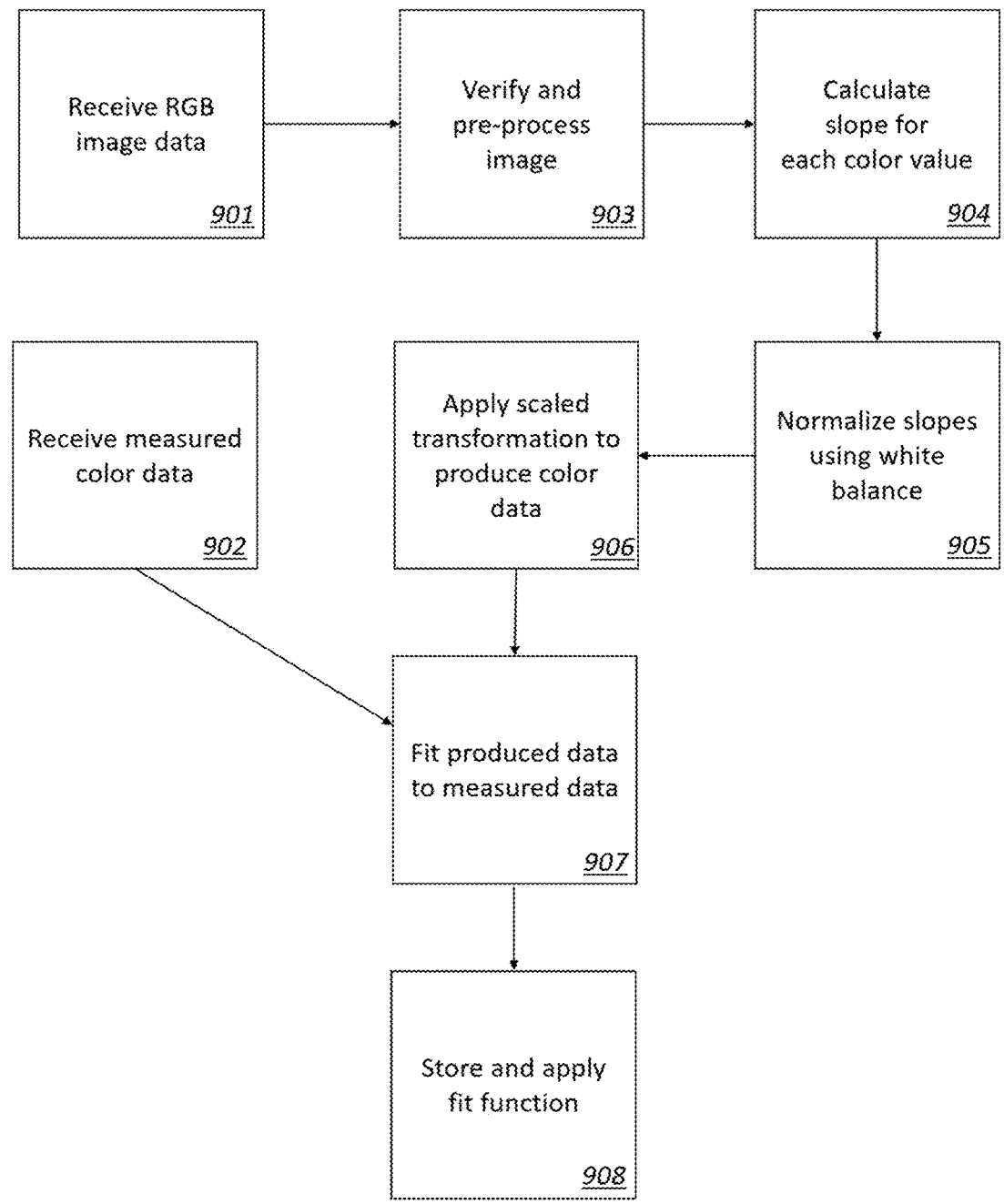
FIG. 9 is a flow chart showing steps for generating a fit function.

As illustrated in the flowchart of FIG. 9, the calibration process involves generating a fit function from this data. RGB image data is received from the camera in step 901, and measured color spectra are received from the spectrometer in step 902. The image data will be unique for the particular camera that is being calibrated, while the data from the spectrometer may in some embodiments be reused in whole or in part depending on the amount of variance between units.

At step 903, the image data may be pre-processed in a variety of ways. For example, a particular region or regions of interest from the bright reference card, representing one or more bright spots on the card, may be identified and those pixels used in the calibration. Filters, smoothing, and other transformations may be applied to get the data values that are then used for the remainder of the procedure.

At step 904, for each color value that is included in the image data (for example, R, B, and G values for the image from the CMOS camera described herein), a slope representing the intensity value versus the exposure time is determined. As described above, determining each slope can require a certain minimum number of images having been taken at different exposure times, such as eight. It may also be necessary to use regression and other techniques to identify and discard values that fall outside of a candidate slope, such as if a particular color value is minimal or saturated.

Figure 10A:
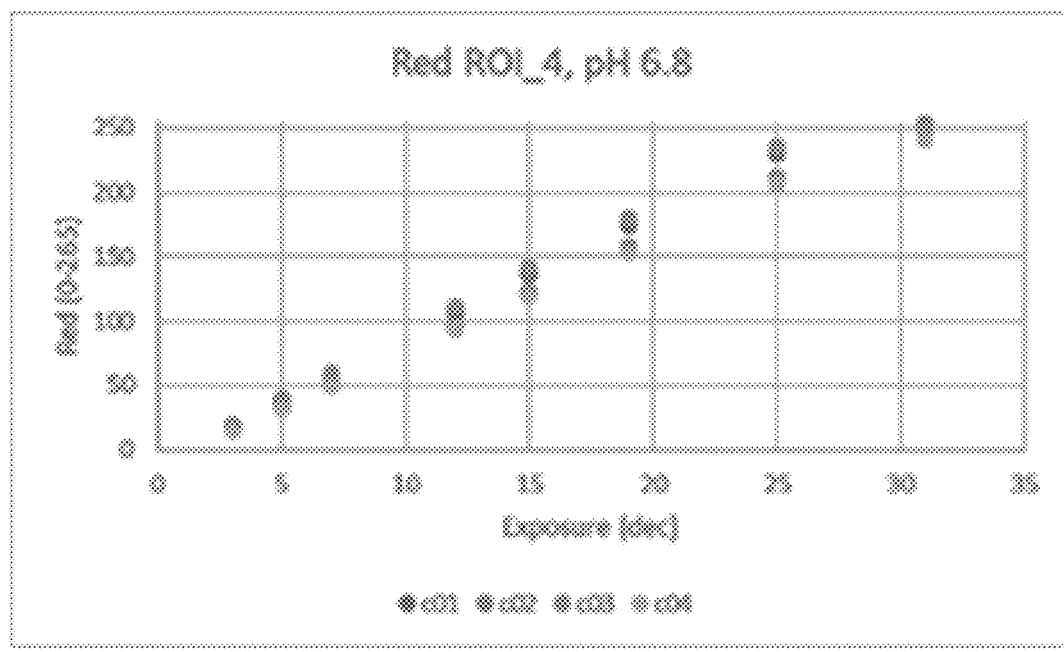
FIGS. 10A-C shows plots of the intensity of red, green, and blue light measured by a digital camera versus the exposure length taken by the camera.
Figure 10B:
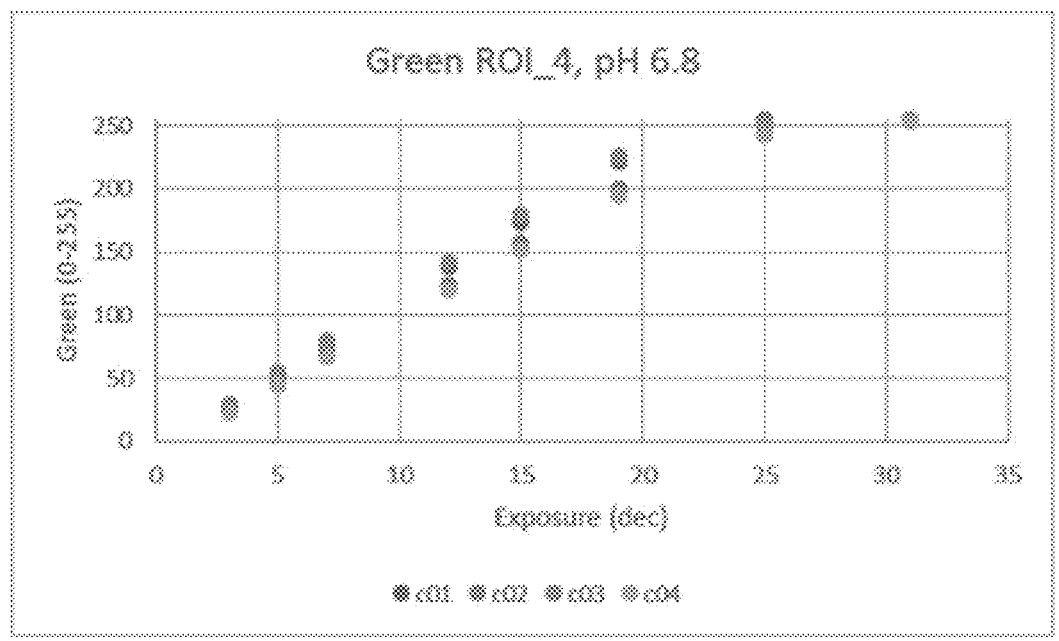
Figure 10C:
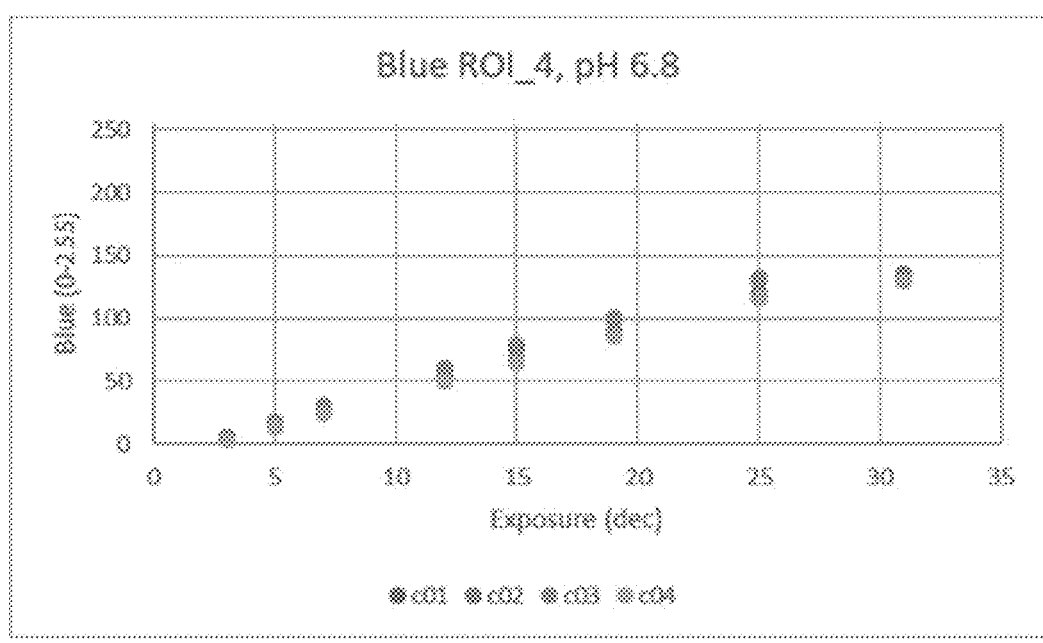

FIGS. 10A-10C illustrate intensity values for R, G, and B respectively, in the range of 0 to 255, plotted against exposure durations of 3 to 31. As shown, each of the three color signals results in a characteristic slope, which can then be taken as a single value.

For example, if the B signal increased uniformly between 25 and 225 from exposure time of 3 to exposure time of 19, then the linear slope of the intensity measurement based on increase in exposure time would be 200/16=25. A more rapid increase in a particular value would indicate a higher slope, and a more gradual increase would indicate a lower slope.

At step 905, the slopes can be normalized based on white color balancing. This factors in the light conditions associated with the light module when determining the slope values to use. For example, where fully white screen has a blue slope of 30 for this light module, the blue slope of 25 would be normalized as 25/30=0.83. Each color value, representing a linear slope, is therefore converted into a scaled value between 0 and 1 based on its ratio to the white slope.

At step 906, a scaled transformation is applied to the color values to convert them into spectral data. Several transformations are known in the art that convert RGB color values into CIELAB spectral values, such as the sRGB transformation. One of ordinary skill will recognize that, depending on the nature of the CMOS or other RGB sensors in use for imaging, the particular conversion to CIELAB spectral values may vary.

In one embodiment, the scaled RGB slope values (each of which will be between 0 and 1) can be transformed using a matrix, such as the characteristic matrix of the sRGB reverse transfer function known in the art. The matrix below is used to translate linear slope data into a characteristic white point, D65, recognized under the CIE standard:

$$\begin{bmatrix} X_{D65} \\ Y_{D65} \\ Z_{D65} \end{bmatrix} = \begin{bmatrix} 0.41239080 & 0.35758434 & 0.18048079 \\ 0.21263901 & 0.71516868 & 0.07219232 \\ 0.01933082 & 0.11919478 & 0.95053215 \end{bmatrix} \begin{bmatrix} R_{linear} \\ G_{linear} \\ B_{linear} \end{bmatrix}$$

From the obtained CIE XYZ values, the data can then be converted to CIELAB format in step 907 using the CIE 1976 L*a*b* color space, which is a set of characteristic functions as provided in "International Standard ISO/CIE 11664-4: 2019(E) Colorimetry—Part 4: CIE 1976 L*a*b* colour space." In particular, the CIE 1976 L*a*b* color space is a three-dimensional, approximately uniform color space produced by plotting in rectangular coordinates, L*, a*, b*, quantities, as defined by formulas (1) to (3) below:

$$L^* = 116 f\left(\frac{Y}{Y_n}\right) - 116 \tag{1}$$

$$a^* = 500 \left[ f\left(\frac{X}{X_n}\right) - f\left(\frac{Y}{Y_n}\right) \right] \tag{2}$$

$$b^* = 200 \left[ f\left(\frac{Y}{Y_n}\right) - f\left(\frac{Z}{Z_n}\right) \right] \tag{3}$$

where $$f\left(\frac{X}{X_n}\right) = \sqrt[3]{\left(\frac{X}{X_n}\right)} \text{ if } \left(\frac{X}{X_n}\right) > \sqrt[3]{\left(\frac{6}{29}\right)}$$

$$f\left(\frac{X}{X_n}\right) = (841/108)\left(\frac{X}{X_n}\right) + 4/29 \text{ if } \left(\frac{X}{X_n}\right) \le \sqrt[3]{\left(\frac{6}{29}\right)}$$

and $$f\left(\frac{Y}{Y_n}\right) = \sqrt[3]{\left(\frac{Y}{Y_n}\right)} \text{ if } \left(\frac{Y}{Y_n}\right) > \sqrt[3]{\left(\frac{6}{29}\right)}$$

$$f\left(\frac{Y}{Y_n}\right) = (841/108)\left(\frac{Y}{Y_n}\right) + 4/29 \text{ if } \left(\frac{Y}{Y_n}\right) \le \sqrt[3]{\left(\frac{6}{29}\right)}$$

and $$f\left(\frac{Z}{Z_n}\right) = \sqrt[3]{\left(\frac{Z}{Z_n}\right)} \text{ if } \left(\frac{Z}{Z_n}\right) > \sqrt[3]{\left(\frac{6}{29}\right)}$$

$$f\left(\frac{Z}{Z_n}\right) = (841/108)\left(\frac{Z}{Z_n}\right) + 4/29 \text{ if } \left(\frac{Z}{Z_n}\right) \le \sqrt[3]{\left(\frac{6}{29}\right)}$$

where
  X, Y, Z are the tristimulus values of the test colour stimulus based on the CIE 1931 standard colorimetric system defined in ISO/CIE 11664-1;

$X_n, Y_n, Z_n$ are the corresponding tristimulus values of a specified white stimulus.

One of ordinary skill in the art will understand that the specified white stimulus and characteristic functions are empirically derived, and that the use of other reference functions and points within the CIE color space may be appropriate for particular embodiments.

While the above example uses a linear transformation, any other analytical function matching the shape of the correlated color data could be used. In general, a different fit function f( ) and set of parameters, p1, p2, . . . may be applied to each of L*, a*, and b* camera values as follows:

$$L^*_{corrected} = f_L(L^*_{camera}, p_{1L}, p_{2L}, p_{3L}, \ldots)$$

$$a^*_{corrected} = f_a(a^*_{camera}, p_{1a}, p_{2a}, p_{3a}, \ldots)$$

$$b^*_{corrected} = f_b(b^*_{camera}, p_{1b}, p_{2b}, p_{3b}, \ldots)$$

The available analytic functions and included parameters for these fit functions may differ between the three values L*, a*, and b* in some embodiments, and may depend on the desired speed and accuracy of fit. Specific fit functions may be preselected and applied in certain embodiments where the differences between camera and corrected values are known, while in some embodiments, the particular fit functions used to make these corrections may depend on the data collected during the correlation steps described above. After determining the fit functions, the fit function can be stored in step 908.

Color Assay

Figure 11:
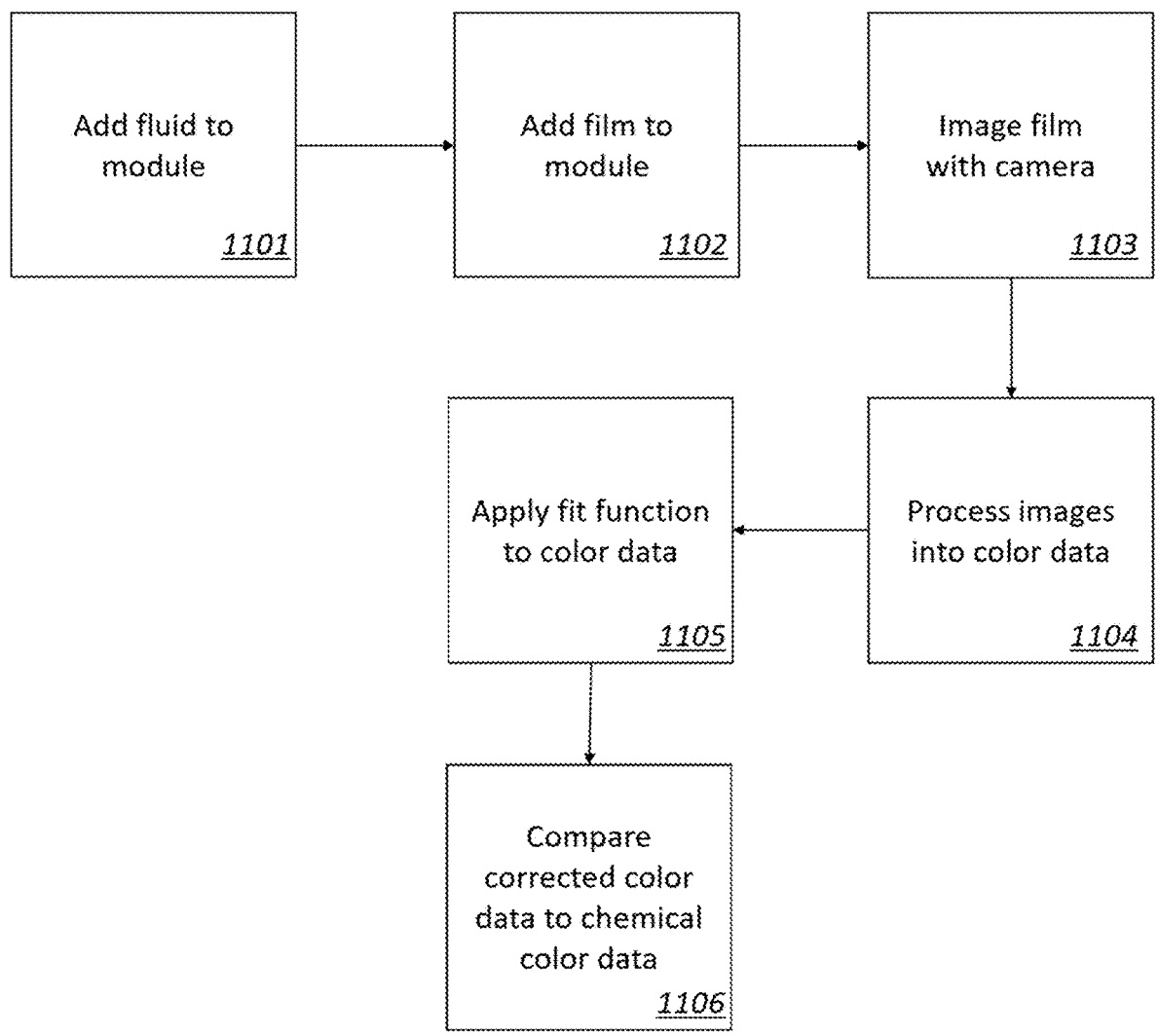
FIG. 11 is a flow chart showing steps for chemical assay using a fluid sensor apparatus.

FIG. 11 illustrates a method of chemical assay using the sensor device. At step 1101, a fluid is placed in a module. As described above, the device may include control mechanisms to ensure that a controlled volume of the solution enters the appropriate chamber of the module. If the fluid is a liquid solution, for example, the control mechanisms act to reduce the presence of air bubbles and other disturbances that may affect the function of the device. At step 1102, sensor film is inserted in the module. The sensor film may be a single material that reacts according to the properties of the fluid, or may include multiple materials that act independently according to different properties of the fluid. As described above, the film can be inserted such that it is on the same side as the light module and opposite the camera from the fluid.

At step 1103, the camera takes images of the sensor film through the fluid. As described above with respect to 807, multiple images are taken that reflect a variety of exposure times. For each color value (which can, for example, include the RGB color values collected by a CMOS camera), intensities are recorded for each of the multiple exposure times, allowing for the construction of a linear slope of intensity versus exposure for each color value, as discussed above with respect to FIG. 9.

At step 1104, the images are processed into color spectra. This may involve steps analogous to steps 903-906 above: identifying the regions of interest in the images, generating linear slopes for each color value, normalizing those slopes into ratios using the color balance, and applying scaled transformations to convert those values into CIELAB color data. In some embodiments, the same modules may be used to implement some or all of these steps whether for calibration or for measurement.

At step 1105, the stored fit function is used to correct the color data. This correlates the camera's image with the spectral measurements that would have been taken by the spectrometer, despite the spectrometer itself not being part of the device. Each of the elements of the spectral color data is corrected, and it is the corrected color data that is used for assay purposes.

At step 1106, the data is compared against measurements according to the type or types of assay being performed. In one non-limiting example, the system may include stored spectra for the colors associated with a pH sensor film exposed to solutions of 6.2, 6.6, 7.0, 7.4, and 7.8 pH, respectively. Other suitable pH solutions are contemplated. The corrected color data can then be compared each of these stored color data, and the closest match made. By comparing the corrected color data against the known color data for particular sensor film results, a match between a measured color and a chemical property can be made automatically.

Figure 12:
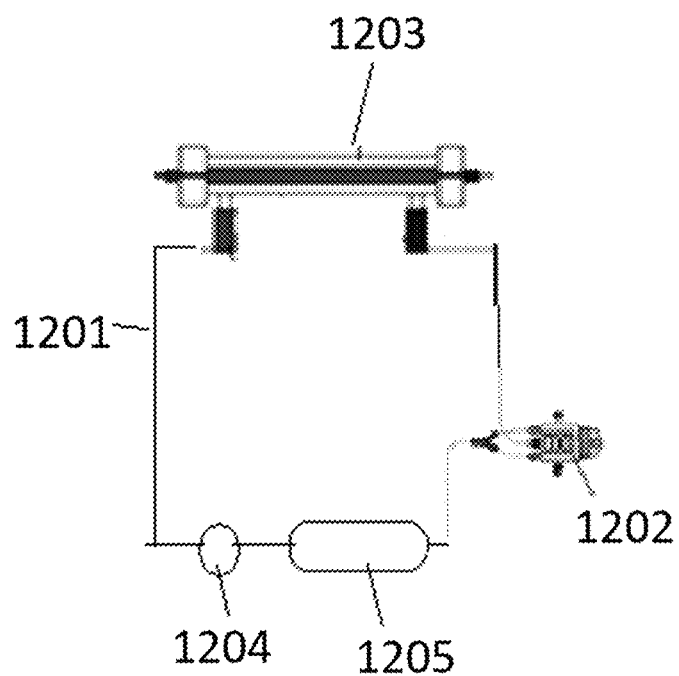
FIG. 12 shows a dialysate flow path including the fluid sensor apparatus.

One non-limiting application of the fluid sensor apparatus is dialysis including hemodialysis, peritoneal dialysis, ultrafiltration, and the like. Moreover, the fluid sensor apparatus can be used in any application with any fluid in which the composition, color, or clarity of the fluid is being determined. FIG. 12 illustrates a non-limiting exemplary embodiment of a dialysate flow path including the fluid sensor apparatus 1202 fluidly connected to the dialysate flow path. One of skill in the art will understand that the dialysate flow path 1201 illustrated in FIG. 12 is a simplified flow path, and that any number of additional components can be added as necessary. Dialysate pump 1204 provides the driving force for flowing the dialysate through the dialysate flow path 1201. Dialysate in the dialysate flow path 1201 passes through a dialyzer 1203. Blood from a patient is flowed through a blood flow path (not shown) and into the dialyzer 1203. Solutes in the blood and dialysate can cross a semipermeable membrane in the dialyzer 1203 to move from a high concentration side of the membrane to a low concentration side of the membrane. A principal waste product removed during dialysis is urea, which moves from the patient's blood into the dialysate in the dialyzer 1203. The urea is removed from the dialysate in sorbent cartridge 1205, which can contain urease to catalyze the conversion of urea to ammonium ions and carbonate ions. The ammonium ions can be removed by a cation exchange membrane or layer in the sorbent cartridge 1205, as ammonia would be poisonous to pass back to the patient. Even though the ammonium ions are generally removed by the process, monitoring the presence of ammonium ions in dialysate fluid is desirable. One or more solute concentrations of a fluid can be determined by ammonia or ammonium ion concentration along with the pH of the fluid. A total ammonia content of a fluid can be determined by ammonia or ammonium ion concentration along with the pH of the fluid. The fluid sensor apparatus 1202, containing a sensor card as described, can determine the ammonia level and ensure that the dialysate does not have an ammonia level in excess of a predetermined limit. The fluid sensor apparatus 1202 can be placed downstream of the sorbent cartridge 1205 and upstream of the dialyzer 1203, allowing the ammonia level and pH of the dialysate to be determined after conversion of urea to ammonium ions, but prior to passing the dialysate back through the dialyzer 1203. The fluid sensor apparatus 1202 can determine the pH and ammonia level in any fluid used in dialysis, including a dialysis fluid, a peritoneal dialysis fluid, a hemodialysis fluid, or a rinseback fluid. Although illustrated in FIG. 12 as a hemodialysis system, the fluid sensor apparatus can also be used in peritoneal dialysis to determine the pH and ammonia level of any peritoneal dialysis fluid. As described, a temperature sensor can be included either within the fluid sensor apparatus 1202, or at any place within the dialysate flow path 1201.

The fluid sensor apparatus can also be used to detect substances in gaseous fluids in addition to aqueous solutions. For example, when used to detect ammonia, ammonia gas in an environment can produce a detectable change in the ammonia sensing membranes in either the gaseous or solution state. As a non-limiting example, the fluid sensor apparatus can be used to detect ammonia in a refrigerated room where ammonia is used as the refrigerant. Air can flow over the sensors within the fluid sensor apparatus, and the presence of ammonia will produce a detectable change in the ammonia sensing membranes. The air flow through the fluid sensor apparatus can be active or passive. A fan can be included in the fluid sensor apparatus for active gas flow across the sensors.

As a further example, gaseous ammonia detection can also be used on exhaled breath, where the presence of ammonia can be used to help to screen and/or diagnose patients for certain procedures such as dialysis. The exhaled breath can be passed through a fluid chamber running between an imaging device and test strip as described above, with the device indicating a possible need for further examination if ammonia gas is detected.

One skilled in the art will understand that various combinations and/or modifications and variations can be made in the described systems and methods depending upon the specific needs for operation. Features illustrated or described as being part of an aspect of the invention may be used in the aspect of the invention, either alone or in combination.

What is claimed is:

1. A method for calibrating a digital camera for use in a dialysis system, comprising the steps of:
    providing:
        the dialysis system including a fluid sensor apparatus; and
        the digital camera to be calibrated for use in the dialysis system, wherein the digital camera is configured to receive light projected through the fluid sensor apparatus, when installed to the fluid sensor apparatus;
        determining fit parameters for a characteristic equation that inputs a set of two or more image color values associated with a captured image element and outputs a spectral color value, wherein the fit parameters are based on:
    images taken at a plurality of different exposure times by the digital camera of each of a plurality of light sources, a set of image color values for each of two or more colors associated with elements in each captured image, and one or more spectral color values associated with each of the plurality of light sources obtained from spectrometer measurements; and
    calibrating the digital camera when used in the dialysis system, wherein the calibration is based on at least the determined fit parameters and the characteristic equation.

2. The method of claim 1, wherein each of the one or more spectral color values are determined from separate count values of two or more wavelengths measured by the spectrometer.

3. The method of claim 1, wherein:
    each set of image color values comprise RGB values, and
    each spectral color value comprises one or more of the CIELAB color space coordinates, L*, a*, and/or b*.

4. The method of claim 3 wherein, for each of the plurality of light sources and for each of the RGB values, slope is determined representing a linear relationship between exposure time and image color value, the slope used to determine fit parameters for the characteristic equation.

5. The method of claim 1, the camera further including an on-board LED module, the method further comprising the steps of:
    for each of a plurality of color reference cards, imaging the card illuminated by the LED module using the digital camera; and
    determining brightness and color correction factors on the image color values based on the images of the color references cards.

6. The method of claim 5, wherein the color reference cards are filmed through an aqueous solution.

7. The method of claim 1, further comprising:
    for each of one or more chemical sensor films, measuring the film by the spectrometer through an aqueous solution of a chemical associated with the one or more chemical sensor films, and associating a spectral color value with each chemical sensor film;
    the fit parameters are determined based on the associated spectral color values of the one or more chemical sensor films.

8. The method of claim 7, the camera further including an onboard LED module, the LED module illuminating each of the one or more chemical sensor films when measuring by the spectrometer.

9. The method of claim 1, further comprising:
    for each of the one or more chemical sensor films, measuring the film by the spectrometer through a gas including a chemical associated with the sensor film, and associating a spectral color value with each chemical sensor film;
    the fit parameters are determined based on the associated spectral color values of the one or more chemical sensor films.

* * * * *